(12) United States Patent
Lowe et al.

(10) Patent No.: US 10,472,093 B2
(45) Date of Patent: Nov. 12, 2019

(54) RUNWAY ARRANGEMENT

(71) Applicant: Runway Innovations Limited, Kingston upon Thames (GB)

(72) Inventors: William Dennis Lowe, Marlow (GB); Peter Lonergan, Weybridge (GB); Steven Dennis John Costello, Weybridge (GB); Richard Mark Bostock, Barbican (GB)

(73) Assignee: Runway Innovations Limited, London (GB)

( * ) Notice: Subject to any disclaimer, the term of this patent is extended or adjusted under 35 U.S.C. 154(b) by 0 days.

(21) Appl. No.: 15/302,775

(22) PCT Filed: Apr. 9, 2015

(86) PCT No.: PCT/GB2015/051089
§ 371 (c)(1),
(2) Date: Oct. 7, 2016

(87) PCT Pub. No.: WO2015/155541
PCT Pub. Date: Oct. 15, 2015

(65) Prior Publication Data
US 2017/0036778 A1 Feb. 9, 2017

(30) Foreign Application Priority Data

Apr. 9, 2014 (GB) .................. 1406419.0

(51) Int. Cl.
*B64F 1/00* (2006.01)
*B64F 1/20* (2006.01)
(Continued)

(52) U.S. Cl.
CPC .................. *B64F 1/20* (2013.01); *B64F 1/00* (2013.01); *F21V 11/18* (2013.01); *G08G 5/025* (2013.01); *F21W 2111/06* (2013.01)

(58) Field of Classification Search
CPC .... B64F 1/00; B64F 1/002; B64F 1/36; E01C 1/002
See application file for complete search history.

(56) References Cited

U.S. PATENT DOCUMENTS

| 1,747,583 | A | * | 2/1930 | Hadden | ..................... | B64F 1/00 244/114 R |
| 1,850,490 | A | * | 3/1932 | Bahl | ........................ | B64F 1/00 244/114 R |

(Continued)

FOREIGN PATENT DOCUMENTS

| DE | 10013946 | 9/2001 |
| EP | 2160625 | 3/2010 |

(Continued)

OTHER PUBLICATIONS

"International Application No. PCT/GB2015/051089, International Search Report and Written Opinion dated Oct. 22, 2015", (dated Oct. 22, 2015), 16 pgs.

(Continued)

*Primary Examiner* — Brian M O'Hara
(74) *Attorney, Agent, or Firm* — Schwegman Lundberg & Woessner, P.A.

(57) ABSTRACT

A device for marking a runway section, the device comprising: a light source; and a light director.

7 Claims, 27 Drawing Sheets

(51) Int. Cl.
*F21V 11/18* (2006.01)
*G08G 5/02* (2006.01)
*F21W 111/06* (2006.01)

(56) References Cited

U.S. PATENT DOCUMENTS

| | | | |
|---|---|---|---|
| 1,903,847 A * | 4/1933 | Wood, Jr. | B64F 1/00 |
| | | | 244/114 R |
| 2,371,979 A * | 3/1945 | Phillips | G01S 1/02 |
| | | | 116/246 |
| 2,765,994 A | 10/1956 | Jordanoff | |
| 3,325,124 A | 6/1967 | Woldemar | |
| 3,362,368 A * | 1/1968 | Ringleb | B64F 1/04 |
| | | | 114/187 |
| 3,554,470 A * | 1/1971 | Dudley | B64F 1/00 |
| | | | 244/114 R |
| 3,558,085 A * | 1/1971 | Magill | B64F 1/00 |
| | | | 244/114 R |
| 3,572,619 A | 3/1971 | Brown | |
| 3,729,153 A * | 4/1973 | Wilde | B64F 1/00 |
| | | | 244/114 R |
| 4,218,034 A | 8/1980 | Magill | |
| 5,368,257 A | 11/1994 | Novinger | |
| 6,280,057 B1 | 8/2001 | O'Meara | |
| 6,571,167 B2 | 5/2003 | Schmidt | |
| 7,469,859 B1 | 12/2008 | Campbell | |
| 7,590,484 B2 * | 9/2009 | Gellert | B64F 1/00 |
| | | | 244/110 R |
| 2003/0169602 A1 | 9/2003 | Rizkin et al. | |
| 2009/0043487 A1 | 2/2009 | Gellert | |
| 2011/0098872 A1 | 4/2011 | Lewis | |
| 2015/0239577 A1 | 8/2015 | Lowe et al. | |

FOREIGN PATENT DOCUMENTS

| | | |
|---|---|---|
| GB | 440779 | 1/1936 |
| GB | 485958 | 11/1938 |
| GB | 1235332 | 6/1971 |
| GB | 2506639 A | 4/2014 |
| GB | 2521067 A | 6/2015 |
| JP | 56135399 | 10/1981 |
| JP | 2003045000 A | 2/2003 |
| RU | 2086471 | 8/1997 |
| WO | WO-2006/085339 | 8/2006 |
| WO | WO-2009020853 A1 | 2/2009 |
| WO | WO-2014053801 | 4/2014 |
| WO | WO-2015/155541 | 10/2015 |

OTHER PUBLICATIONS

"United Kingdom Application GB1406419.0, Search Report dated Nov. 13, 2014", (dated Nov. 13, 2014), 4 pgs.
"United Kingdom Application GB1506060.1, Search Report dated Sep. 25, 2015", (dated Sep. 25, 2015), 5 pgs.
"U.S. Appl. No. 14/432,719, Advisory Action dated Feb. 14, 2019", 3 pgs.
"U.S. Appl. No. 14/432,719, Examiner Interview Summary dated Jan. 31, 2019", 4 pgs.
"U.S. Appl. No. 14/432,719, Examiner Interview Summary dated Jul. 13, 2018", 4 pgs.
"U.S. Appl. No. 14/432,719, Final Office Action dated Apr. 21, 2017", 21 pgs.
"U.S. Appl. No. 14/432,719, Final Office Action dated Nov. 30, 2018", 22 pgs.
"U.S. Appl. No. 14/432,719, Non Final Office Action dated Jan. 24, 2018", 12 pgs.
"U.S. Appl. No. 14/432,719, Non Final Office Action dated Jul. 12, 2016", 19 pgs.
"U.S. Appl. No. 14/432,719, Preliminary Amendment filed Mar. 31, 2015", 4 pgs.
"U.S. Appl. No. 14/432,719, Response filed Jan. 30, 2019 to Final Office Action dated Nov. 30, 2018", 20 pgs.
"U.S. Appl. No. 14/432,719, Response filed Oct. 23, 2017 to Final Office Action dated Apr. 21, 2017", 14 pgs.
"U.S. Appl. No. 14/432,719, Response to Non Final Office Action dated Jan. 24, 2018 filed Jun. 25, 2018", 11 pgs.
"U.S. Appl. No. 14/432,719, Supplemental Preliminary Amendment filed Dec. 16, 2015", 7 pgs.
"U.S. Appl. No. 14/432,719, Supplemental Response to Non Final Office Action dated Jan. 24, 2018 filed Jul. 20, 2018", 16 pgs.
"U.S. Appl. No. 14/432,719, Response filed Dec. 12, 2016 to Non Final Office Action dated Jul. 12, 2016", 15 pgs.
"Chinese Application No. 201380062988.8, Granted specification CN104822593B dated Jul. 17, 2018", (dated Jul. 17, 2018), 38 pgs.
"Chinese Application No. 201380062988.8, Notice of Allowability dated Apr. 9, 2018", (dated Apr. 9, 2018), 1 pg.
"International Application No. PCT/GB2013/000418, International Search Report and Written Opinion dated Feb. 12, 2014'", (dated Feb. 12, 2014), 11 pgs.
"Part 1: Runways", Aerodrome Design Manual, International Civil Aviation Organization, Third Edition (2006), p. 2-4, (2006), 1 pg.
"Preliminary Feasibility Study for Runway Extension", Roseburg Regional Airport, [Online]. Retrieved from the Internet: <http://www.cityofroseburg.org/files/3513/1112/0632/PreliminaryFeasibilityStudyforRunwayExtension.pdf>, (Oct. 2007).
"Russian Application No. 20154116321, Office Action dated Oct. 24, 2017", (dated Oct. 24, 2017), 14 pgs.
"Singapore Application No. 11201502571Q, Details of Patent", Application Status: Patent In Force; Date of Grant of Patent: Mar. 14, 2017; printed from official Singapore Government website www.ip2.sg, (dated Jul. 23, 2018), 28 pgs.
"Singapore Application No. 11201502571Q, Examination Report dated Dec. 30, 2016", (dated Dec. 30, 2016), 4 pgs.
"Singapore Application No. 11201502571Q, First Written Opinion dated Jan. 5, 2016", (dated Jan. 5, 2016), 12 pgs.
"Singapore Application No. 11201502571Q, Notification of Grant dated Mar. 14, 2017", (dated Mar. 14, 2017), 2 pgs.
"Singapore Application No. 11201502571Q, Response to Written Opinion dated Jan. 5, 2016", (dated Jan. 5, 2016), 19 pgs.
"Singapore Application No. 11201502571Q, Second Written Opinion dated Jul. 8, 2016", (dated Jul. 8, 2016), 5 pgs.
"United Kingdom Application No. GB1217812.5, Search Report Under Section 17 dated Feb. 22, 2013", (dated Feb. 22, 2013), 4 pgs.
"European Application No. 15723733.0, Communication pursuant to Rule 164(2)(b) and Article 94(3) EPC dated Jul. 23, 2018", (dated Jul. 23, 2018), 10 pgs.
"Japanese Application Serial No. 2017-504282, Notice dated Mar. 5, 2019", (w/ English Translation), 9 pgs.
"Chinese Application No. 201580030834.X, Third Office Action dated Jul. 11, 2019", (Jul. 11, 2019), 15 pgs.

* cited by examiner

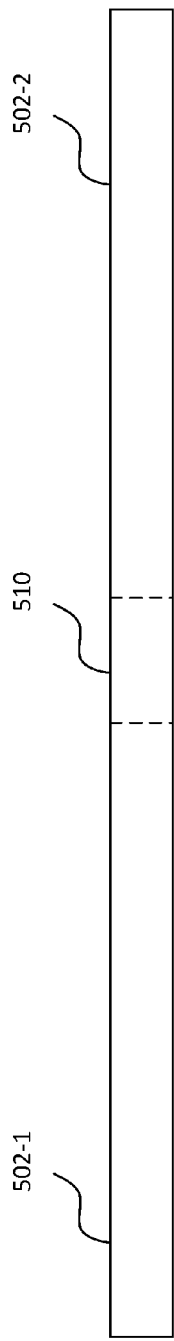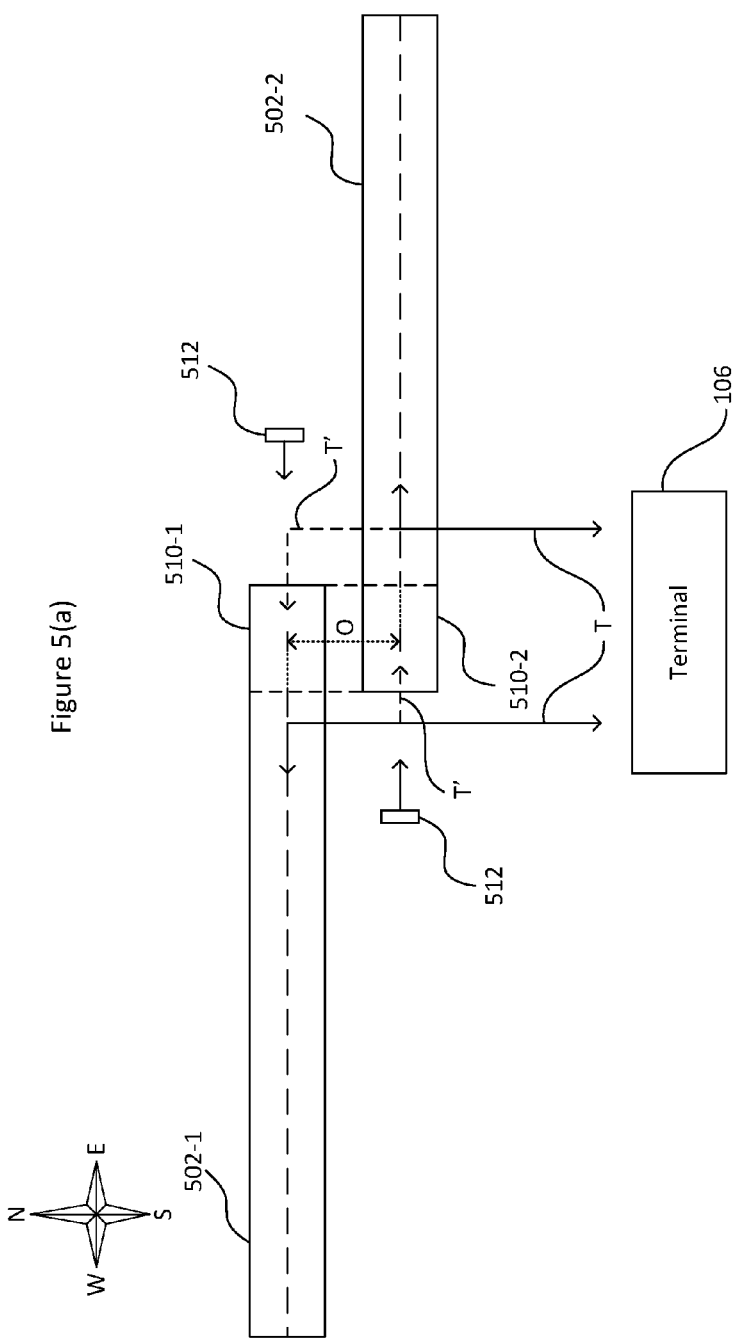

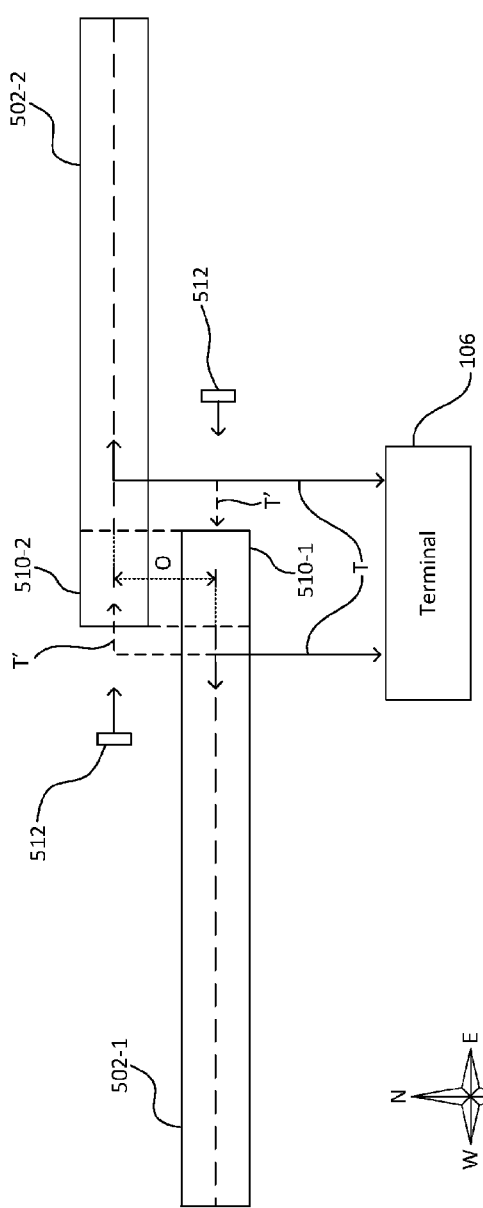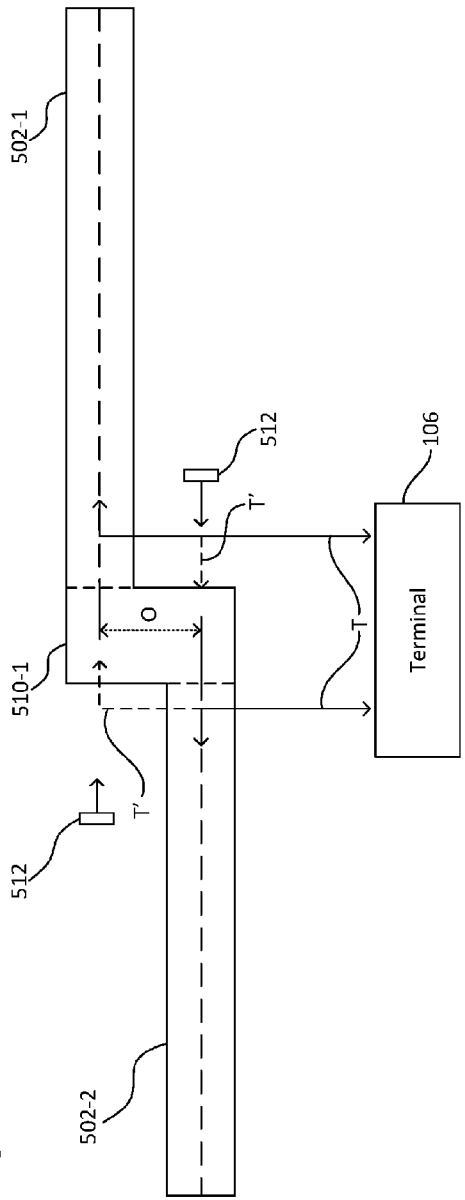

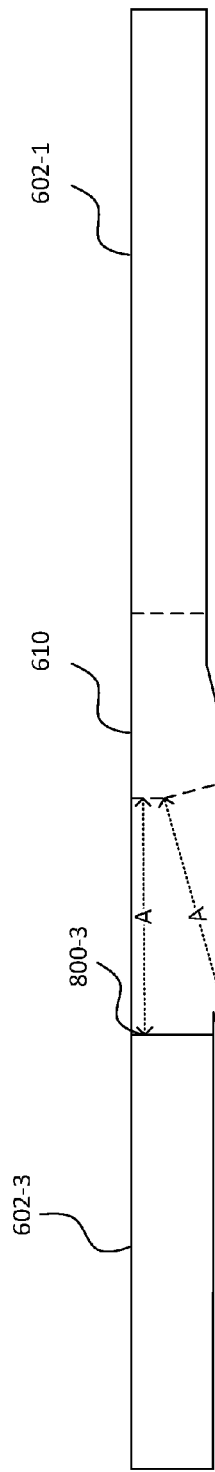
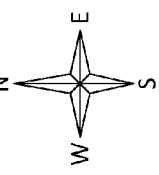
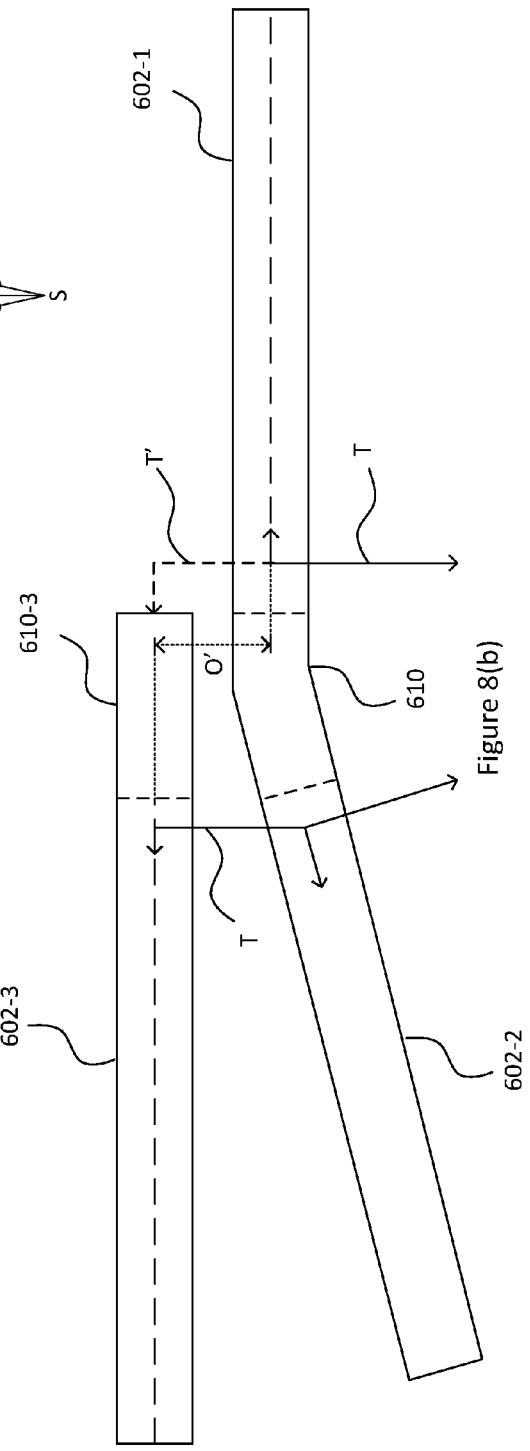

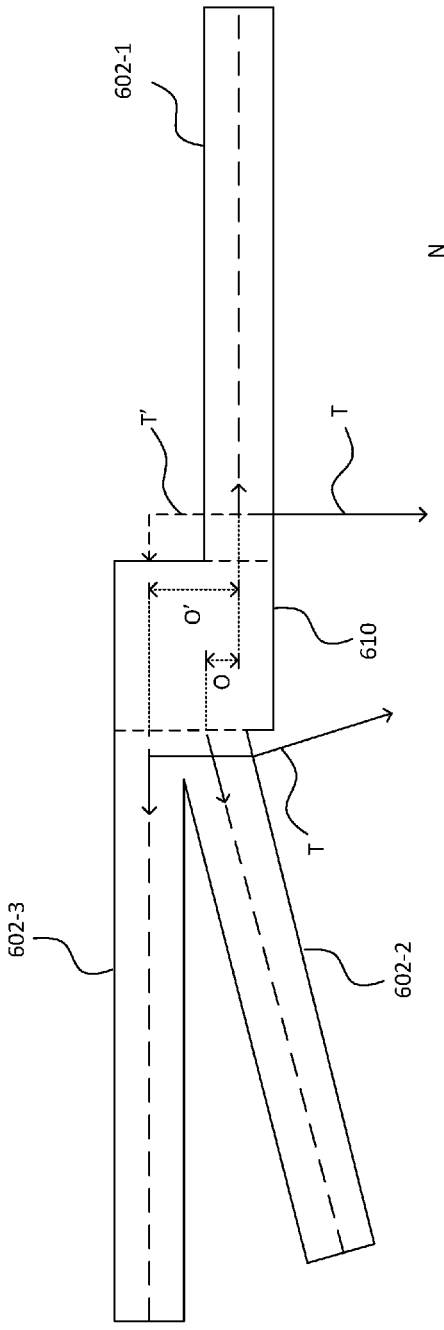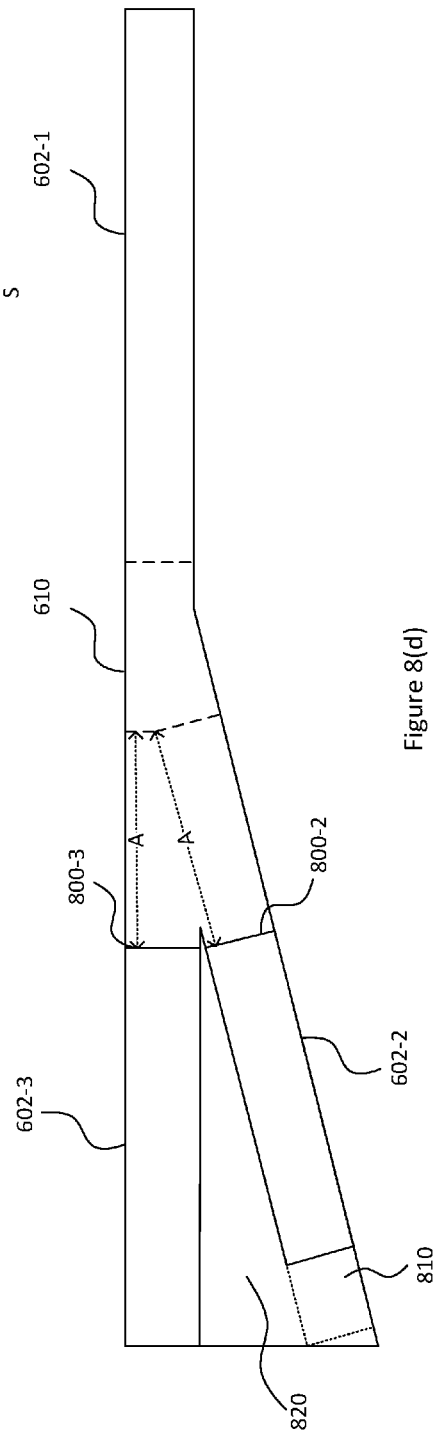

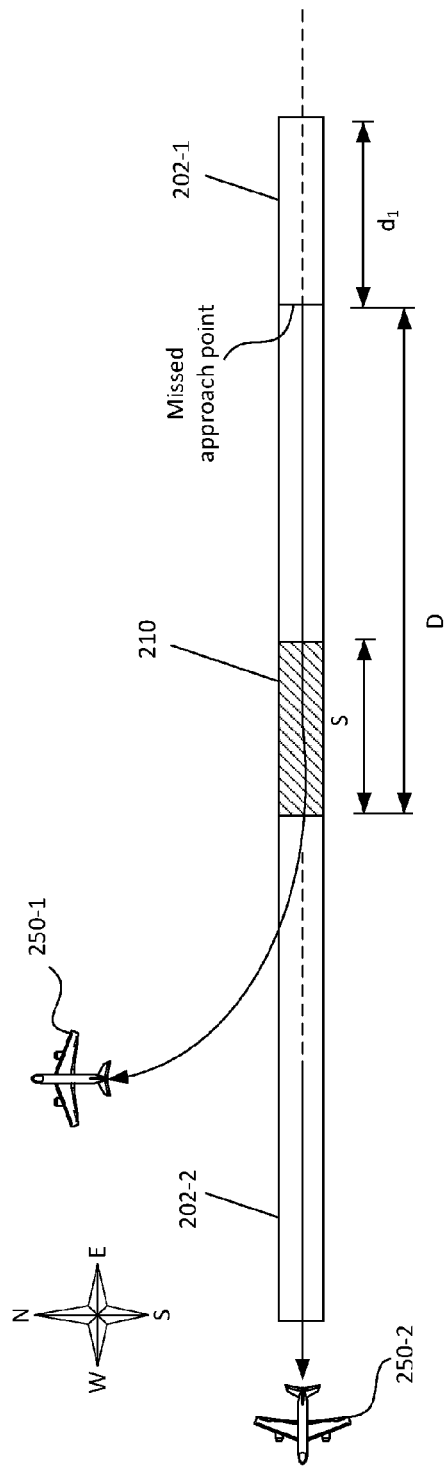
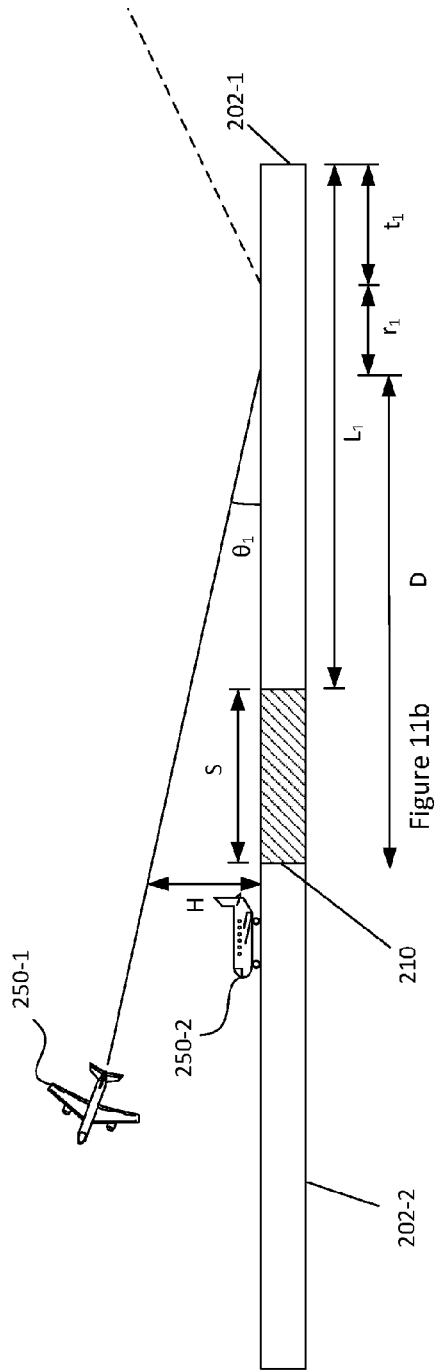
Figure 11a
Figure 11b

RUNWAY ARRANGEMENT

PRIORITY CLAIM TO RELATED APPLICATIONS

This application is a U.S. national stage application filed under 35 U.S.C. § 371 from International Application Serial No. PCT/GB2015/051089, which was filed 9 Apr. 2015, and published as WO2015/155541 on 15 Oct. 2015, and which claims priority to United Kingdom Application No. GB 1406419.0, filed 9 Apr. 2014, which applications and publication are incorporated by reference as if reproduced herein and made a part hereof in their entirety, and the benefit of priority of each of which is claimed herein.

FIELD OF INVENTION

This invention relates to a runway arrangement and a method of constructing and operating the same. The invention also relates to a light or system of lights for a runway arrangement and a method of operating the same.

BACKGROUND

Airport capacity (the number of aircraft able to land and/or take off per hour) is often limited by the size, number and configuration of the runways. For safety reasons, there has to be a certain time and distance separation between aircraft landing and/or taking off on the same runway. Often, multiple runways are used; designated either for landing, take-off or mixed mode (where runways are used for both take-offs and landings in turn). This increases airport capacity, but multiple runways need to be spaced sufficiently apart so as not to interfere with one another and to comply with regulatory and safety requirements. In urban or other constrained environments, adequate space for an additional runway may not be readily available, and/or the noise footprint from aircraft using a new runway may not be acceptable. Furthermore, the added time and fuel incurred by taxiing aircraft to a runway further from the terminal may add to the operating cost and $CO_2$ emissions of the flight.

For safety of operation, and so as pilots are guided to the correct runway section, according to an aspect of the present invention there is provided a device for marking a runway section, the device comprising: a light source; and a light director.

Preferably, to guide landing aircraft, the light director is arranged so as to inhibit light directed towards an aircraft landing on said runway section emitted by the light source.

Preferably, the light director is adjustable between a first state indicating a landing runway section and a second state indicating a non-landing runway section.

Preferably, the light director comprises a lens.

Preferably, the light director comprises means for selectively blocking the light from the light source.

Preferably, the blocking means is angled with respect to the light source.

Preferably, the light director comprises an opaque covering.

Preferably, the light director comprises means for polarising light, and preferably the polarising means comprises a polarising filter.

Preferably, the light directing means is movable with respect to the light source.

Preferably, the light directing means is rotatable.

Preferably, the light source is adapted to be positioned on the edge of a runway arrangement.

Preferably, the light source is adapted to be positioned on the centreline of a runway arrangement.

According to another aspect of the present invention, there is provided a device for marking a runway section, having a plurality of devices for marking a runway section as described herein.

According to another aspect of the present invention, there is provided a device for marking a runway section; comprising a plurality of runway light sources adapted to be arranged along a runway section; a light director for each runway light source; wherein the light director is arranged so as to inhibit light directed towards an aircraft landing on said runway section emitted by its respective light source; thereby designating said runway section as a non-landing runway section. Such a device allows for safe independent operation of a runway section Preferably, the light director comprises an artificial vision system. Preferably, the artificial vision system comprises at least one of: head-up display, helmet-mounted display, and visual display.

Preferably, the light director is arranged so as to direct light from the light source towards aircraft on said runway section; thereby designating said runway section as a take-off runway section.

Preferably, each light director is angled with respect to its respective light source in dependence on the light source's intended position along a runway section.

Preferably, the light directors intended to be placed at a more proximal position along said runway section are angled to a greater extent than those intended to be placed a more distal position along said runway section.

According to another aspect of the present invention there is provided a runway arrangement comprising a first runway section; a second runway section extending substantially in prolongation of the first runway section, said second runway section having a plurality of runway marking devices each comprising a runway light source and a light director for each runway light source; and an intermediate section between the first and second runway sections; wherein each light director is arranged so as to inhibit light directed towards an aircraft landing on said first runway section towards said intermediate section emitted by its respective light source; thereby designating said second runway section as a non-landing runway section.

Preferably, so as to enable operation in either direction, the first runway section comprises a plurality of runway marking devices each comprising a runway light source and a light director for each runway light source; wherein each light director is arranged so as to inhibit light directed towards an aircraft landing on said second runway section towards said intermediate section emitted by its respective light source; thereby designating said first runway section as a non-landing runway section.

Preferably, so as to enable 'long landings' to provide respite to local population, the light directors are adapted to be adjusted so as to designate the non-landing runway section as a landing runway section.

Preferably, so as to enable 'long landings' to provide respite to local population, the non-landing runway section further comprises secondary lighting so as to designate the non-landing runway section as a landing runway section.

Preferably, the light director is arranged so that light is directed towards an aircraft on said non-landing runway section, thereby designating said non-landing runway section as a take-off runway section.

Preferably, each runway light source comprises a light director.

Preferably, each runway marking device is a device as described herein.

According to another aspect of the present invention there is provided a method of operating a runway arrangement having a runway lighting system, the method comprising: providing light sources along a first and a second section of a runway arrangement; and providing light directors so as to inhibit light from the lights on said first runway section being directed towards an aircraft landing on said second runway section; thereby designating said second runway section as a non-landing runway section. Such a method allows for safe independent operation of the two runway sections.

Preferably, the runway arrangement comprises the runway arrangement as described herein.

According to another aspect of the present invention there is provided a runway arrangement comprising: a first runway section designated as a landing runway section; a second runway section designated as a take-off runway section; and a sterile safety area; wherein the first and second runway sections are linked by the sterile safety area; the runway arrangement comprising a missed approach point for aircraft due to land on the first runway section, displaced from the start of the second runway section by a distance greater than $H/\tan \theta_1$; where H is a safe turning height and $\theta_1$ is an angle of ascent following a missed approach; wherein H is greater than 150 m and $\theta_1$ is greater than 2°. Such an arrangement allows for safe independent operation of the two runway sections whereby a landing aircraft performing a missed approach is less likely to interfere with another aircraft. The missed approach point may comprise physical markings on the first runway section, or may be defined by software.

Preferably, the missed approach point is between 1,500 m and 4,500 m from the start of the second runway section. Preferably, the missed approach point is between 2,500 m and 3,500 m from the start of the second runway section. Preferably, the missed approach point is approximately 3,000 m from the start of the second runway section.

Preferably, the missed approach point is a landing threshold marked on said first runway section.

Preferably, the landing threshold is between 100 m and 1,500 m from the start of the second runway section. Preferably, the landing threshold is between 100 m and 1,000 m from the start of the second runway section. Preferably, the landing threshold is between 300 m and 800 m from the start of the second runway section. Preferably, the landing threshold is between 500 m and 800 m from the start of the second runway section.

Preferably, the landing threshold is less than 850 m from the start of the second runway section.

Preferably, the landing threshold is substantially at the start of the second runway section.

Preferably, the second runway section is disposed at an angle to the first runway section.

According to another aspect of the present invention there is provided a method of determining a safe approach on a runway arrangement, the runway arrangement comprising a first runway section designated as a landing runway section, a second runway section designated as a take-off runway section, and a sterile safety area, wherein the first and second runway sections are linked by the sterile safety area, the method comprising: designating a missed approach point; and determining said missed approach point as being displaced from the start of the second runway section by a distance greater than $H/\tan \theta_1$; where H is a safe turning height and $\theta_1$ is an angle of ascent following a missed approach. Such a method reduces the possibility of a landing aircraft performing a missed approach interfering with another aircraft departing from the take-off runway section.

Preferably, H is greater than 150 m and $\theta_1$ is greater than 2°.

According to a another aspect of the invention, there is provided a runway arrangement comprising a first runway section; a second runway section; and a sterile safety area; wherein the first and second runway sections are linked by the sterile safety area; and the second runway section is disposed at an angle to the first runway section.

The geometry of the runway arrangement can provide a benefit to the local environment, for example, by preventing the need for demolition of built-up areas, including residential areas and providing relief to the local population. Furthermore, on-ground aircraft safety equipment, such as Instrument Landing Systems (ILS), may be located such that they have a line-of-sight to aircraft approaching either the first or second runway sections.

Preferably, the second runway section is disposed at substantially 0.1-10 degrees to the first runway section, preferably substantially 0.25-10 degrees preferably substantially 1-5 degrees, more preferably substantially 2-3 degrees.

Preferably, second runway section is laterally offset from the first runway section, the lateral offset being in an opposite direction to the direction the second runway section is angled, thereby preferably decreasing interference between aircraft utilizing the first and second runway sections.

Preferably, in order to balance safety and minimise taxiing distance for aircraft to and from an airport terminal, the second runway section is laterally offset from the first runway section by between a quarter and double the width of the first runway section, preferably between 50 m and 100 m, more preferably between 60 m and 80 m.

The runway arrangement may further comprise a laterally offset runway section substantially parallel to, and preferably substantially longitudinally aligned with, said first runway section.

Preferably, in order to make use of the land within the envelope of the runway arrangement efficiently, the second runway section is angled from the safety area towards the laterally offset runway section.

Preferably, in order to ensure safety and prevent aircraft collisions or disruption, the laterally offset runway section is laterally offset from said first runway section so that the centerline of the laterally offset runway does not intersect with the second runway section, preferably wherein the runway arrangement satisfies the inequality $D > L \cdot \sin(\theta)$ or $D + O > L \cdot \sin(\theta)$; preferably wherein D is the lateral separation between the longitudinally aligned runways, L is the length of the second runway section, $\theta$ is the angle that the second runway section is angled, and O is the lateral offset of the first and second runway sections (as defined further below).

Preferably, to improve airport capacity in a land-efficient manner, there is provided a third runway section substantially in prolongation of the first runway section, thereby preferably forming a 'y-shaped' runway arrangement; and the first and third runway sections are linked by a sterile safety area.

The sterile safety area between the first and third runway sections may be linked to the sterile safety area between the first and second runway sections.

Preferably, the third runway section is laterally offset from said first runway section, the lateral offset being in an opposite direction to the angle of the second runway section, thereby preferably affording simultaneous use of the first and third runway section.

Preferably, the third runway section comprises a sterile safety area at the end of the runway section proximal to said first runway section.

Preferably, the sterile safety area at the end of the third runway section is substantially aligned with the sterile safety area between the first and second runway sections.

Preferably, the second runway section is laterally offset from the first runway section, which consequently offsets environmental disruption, for example, away from built-up areas.

Preferably, the runway arrangement comprises two further laterally offset runway sections substantially parallel to, and substantially longitudinally aligned with, said first and/or second runway sections, thereby preferably, for example, preventing the need for demolition of multiple built-up areas, including residential areas and providing relief to a wider local population whilst also improving aircraft capacity.

According to another aspect of the invention, there is provided a runway arrangement comprising a first runway section and a second runway section; wherein the second runway section is laterally offset from the first runway section; and the second runway section longitudinally overlaps with the first runway section; a section not overlapping being for use as a take off or landing section.

The geometry of the runway arrangement can provide a benefit to the local environment, for example, by preventing the need for demolition of built-up areas, including residential areas and providing relief to the local population. Furthermore, on-ground aircraft safety equipment, such as ILS, may be placed with a line-of sight to aircraft moving along either the first or second runway sections.

Typically, for safety, the landing section may be directed towards the overlapping section and the take off section is directed away from the overlapping section.

Preferably, the overlapping section is between 300 m and 900 m in length, preferably substantially 400 m-600 m in length.

Preferably, the overlapping section is a sterile safety area; preferably the sterile safety area is free from on-ground aircraft during normal use of the runway arrangement, thereby preferably allowing the overlapping section to be available for use by aircraft during emergencies or in exceptional circumstances.

Preferably, in order to balance safety and minimise taxiing distance for aircraft to and from an airport terminal the second runway section is laterally offset from the first runway section by between a quarter and double the width of the first runway section, preferably between 50 m and 100 m, more preferably between 60 m and 80 m.

Preferably, there is provided a taxiway outside of the sterile safety area so as to allow access across the first runway section to the proximal end of the second runway section.

Preferably, in order to avoid flight path intersection, the second runway section is substantially parallel to the first runway section.

Preferably, the second runway section is disposed at an angle to the first runway section, thereby preferably shifting the effect that use of the second runway arrangement would have on a local environment and population.

Preferably, the second runway section may be disposed at substantially 0.1-10 degrees to the first runway section, preferably substantially 0.25-10 degrees, preferably substantially 1-5 degrees, more preferably substantially 2-3 degrees. Preferably, subject to the length of the second runway, the second runway section is angled relative to the first runway section so as to avoid flight paths or extensions to the runway arrangement from compromising the local environment or local populations.

According to a further aspect of the invention, there is a method of providing a runway arrangement comprising the steps: providing a first runway section; providing a second runway section; and providing a sterile safety area; wherein the first and second runway sections are linked by the sterile safety area; and the second runway section is disposed at an angle to the first runway section.

Expansion of airport runway arrangements is thereby enabled, in particular where expansion is otherwise restricted (due to, for example, geographic or social constraints).

Preferably, the second runway section is laterally offset from the first runway section, the lateral offset being in an opposite direction to the angle of the second runway section, in order to avoid potential disruption of local environs.

Preferably, in order to enable substantially double capacity, there is an additional step of providing two further laterally offset runway sections substantially parallel to, and substantially aligned with, said first and/or second runway sections.

Preferably, in order to increase capacity, a further laterally offset runway section substantially parallel to, and substantially aligned with, said first runway section is provided, preferably wherein the second runway section is angled, preferably from the first runway section, towards the further laterally offset runway section. Preferably, the lateral offset distance between the first runway section and the laterally offset runway section, D, is 1,000 m-3,000 m, and more preferably 1,400 m-1,600 m.

Preferably, for safety and in order to prevent intersection of flight paths, the laterally offset runway section is laterally offset from said first runway section so that the centerline of the laterally offset runway does not intersect with the second runway section, preferably wherein the runway arrangement satisfies the inequality $D > L \cdot \sin(\theta)$ or $D + O > L \cdot \sin(\theta)$, as defined below.

Preferably, in order to improve capacity whilst making efficient use of land, a third runway section substantially in prolongation of the first runway section is provided, thereby preferably forming a 'y-shaped' runway arrangement; and the first and third runway sections are linked by a sterile safety area.

Preferably, the sterile safety area between the first and third runway sections is linked to the sterile safety area between the first and second runway sections.

Preferably, the second runway section is laterally offset from the first runway section.

According to yet another aspect of the invention, there is a method of providing a runway arrangement comprising the steps of: providing a first runway section; and providing a second runway section; wherein the second runway section is laterally offset from the first runway section; and the second runway section longitudinally overlaps with the first runway section; a section not overlapping being for use as a take off or landing section.

Expansion of airport runway arrangements is thereby enabled, in particular where expansion is otherwise restricted (due to, for example, geographic or social constraints).

Preferably, for efficiency, the landing section is designated for use in a direction towards the overlapping section and the take off section is designated for use in a direction away from the overlapping section.

Preferably, for safety, the overlapping section is a sterile safety area, preferably the sterile safety area is free from on-ground aircraft during normal use of the runway arrangement.

Preferably, the second runway section is laterally offset from the first runway section by between a quarter and double the width of the first runway section, preferably between 50 m and 100 m, more preferably between 60 m and 80 m.

Preferably, a taxiway outside of the sterile safety area is designated so as to allow access across the first runway section to the proximal end of the second runway section, preferably without the need to enter the sterile safety area.

Preferably, to prevent intersection of flight paths, the second runway section is provided substantially parallel to the first runway section.

The second runway section may be provided at an angle to the first runway section.

According to yet a further aspect of the invention there is provided a method of operating an airport runway arrangement for aircraft, the method comprising the steps: directing an aircraft to move along a first runway section; directing an aircraft to move along a second runway section, wherein an aircraft is directed to move along the second runway at an angle relative to and/or with a lateral offset from an aircraft directed to move along the first runway section; and providing a sterile safety area between the first and second runway sections. Aircraft flight paths may therefore be directed so as to avoid built-up areas.

Preferably, the step of directing an aircraft to move along the first runway section comprises directing an aircraft to land, preferably towards the safety area.

Preferably, the step of directing an aircraft to move along the second runway section comprises directing an aircraft to take off, preferably away from the safety area.

Preferably, in order to provide relief to persons local to the airport runway arrangement, the direction that an aircraft is directed to move along the first and/or second runway section is reversed periodically, preferably daily.

Preferably, for safety, the step of directing an aircraft to taxi to the first or second runway section without, preferably under normal operation, entering the safety area.

Preferably, an aircraft is directed to move along a third runway section that is parallel to and/or laterally offset from the first runway section.

Preferably, for safety and in order to provide relief to local residents, an aircraft is directed to move along a curved path when approaching and/or taking off from the first, second and/or third runway sections.

Preferably, the first and second runway sections may be used as a single extended runway (for example for long landings, long take offs or in an emergency) where the first and second runway sections extend substantially in prolongation of one another.

According to another aspect of the present invention, there is provided an airport comprising a runway arrangement as described above. Preferably the airport is London Heathrow airport, UK.

According to another aspect of the present invention, there is provided an airport system comprising an aircraft and at least one of: a runway arrangement as herein described, and an air traffic control system as herein described.

According to yet another aspect of the present invention, there is provided a method of controlling air traffic, being a method of operating an airport runway arrangement, preferably according to the aforementioned method of operation, wherein an aircraft is directed to and/or from the runway arrangement.

The invention extends to any novel aspects or features described and/or illustrated herein. Further features of the invention are characterised by the other independent and dependent claims.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

In this specification the word or can be interpreted in the exclusive or inclusive sense unless stated otherwise.

Furthermore, features implemented in hardware may generally be implemented in software, and vice versa. Any reference to software and hardware features herein should be construed accordingly.

BRIEF DESCRIPTION OF THE DRAWINGS

The invention extends to a runway arrangement, a method of providing a runway arrangement, a method of operating a runway arrangement, an airport and a method of controlling air traffic substantially as herein described with reference to the accompanying drawings.

Preferred features of the invention are now described, purely by way of example, with reference to the accompanying drawings in which:

FIG. 5(a) shows a simplified illustration of the runway arrangements of FIG. 2(a);

FIGS. 5(b), 5(c), 5(d) and 5(e) show modifications of the runway arrangement shown in FIG. 5(a);

FIGS. 8(a), 8(b), 8(c) and 8(d) show runway arrangements corresponding to a combination of FIGS. 5(a), 5(b), 5(c), 5(d), 5(e) and 6;

FIG. 11(a) shows a schematic plan view of a 'go around' performed by a landing aircraft;

FIG. 11(b) shows a corresponding schematic side view of a 'go around' performed by a landing aircraft;

SPECIFIC DESCRIPTION

The term 'runway' used in this description preferably refers to an area designated and certified by the regulatory and safety authorities for use by an aircraft for taking-off and/or landing. Typically, this is a suitably hard surfaced area which is demarcated (i.e. distinct to taxiways etc.) as a runway. Throughout, the term 'sterile' is used to refer to the designation of an area that is preferably to be free from on-ground aircraft, including any aircraft that are taxiing or being maneuvered, under normal operation (i.e. except in emergencies and adverse conditions).

Furthermore, the term "safety area" or, interchangeably, "sterile safety area" (which may include "Intermediate Safety Areas" ("ISAs") or "Intermediate Safety Sections" ("ISSs")) preferably connotes an area or section of runway that is sterile for the purposes of safety. An area designated as a safety area is not used during normal operations, but preferably is only used in the event of an undershoot, overshoot, excursion from the runway, long landing or long take offs, and preferably is not used in the case of a manoeuvre across the runway. Preferably, safety areas are variable or movable. Preferably, safety areas are removable or variable, for example in the event that the entire runway is used for an aircraft manoeuvre (such as take-off or landing). Each section of runway is suitably marked so that aircraft pilots can see where the section of runway designated respectively for arriving and departing aircraft starts and finishes. A person skilled in the art would realise that a wide variety of runway markings and lighting that are currently known in the art would be suitable. The term "intermediate" with reference to safety areas herein preferably signifies that a safety area is in between runway sections in a manner that links the runway sections by providing a surface in which aircraft may manoeuvre between runway sections that are linked by the intermediate safety area via the intermediate safety area, albeit only in exceptional circumstances or adverse conditions.

In the description below the term 'longitudinal length' or 'length' preferably refers to the length of the runway along which an aircraft typically moves when landing or taking-off. The term 'lateral width' or 'width' preferably refers to the width of the runway, or group of runways (depending on context), measured perpendicularly to the longitudinal length.

Existing commercial airports for passenger carrying aircraft often have two or more runways to increase the capacity over a single runway. The configuration of these runways depends on the layout of the airport terminal(s), the space (land) available, the surrounding geography and the prevailing weather conditions (amongst other factors).

Figure 1:
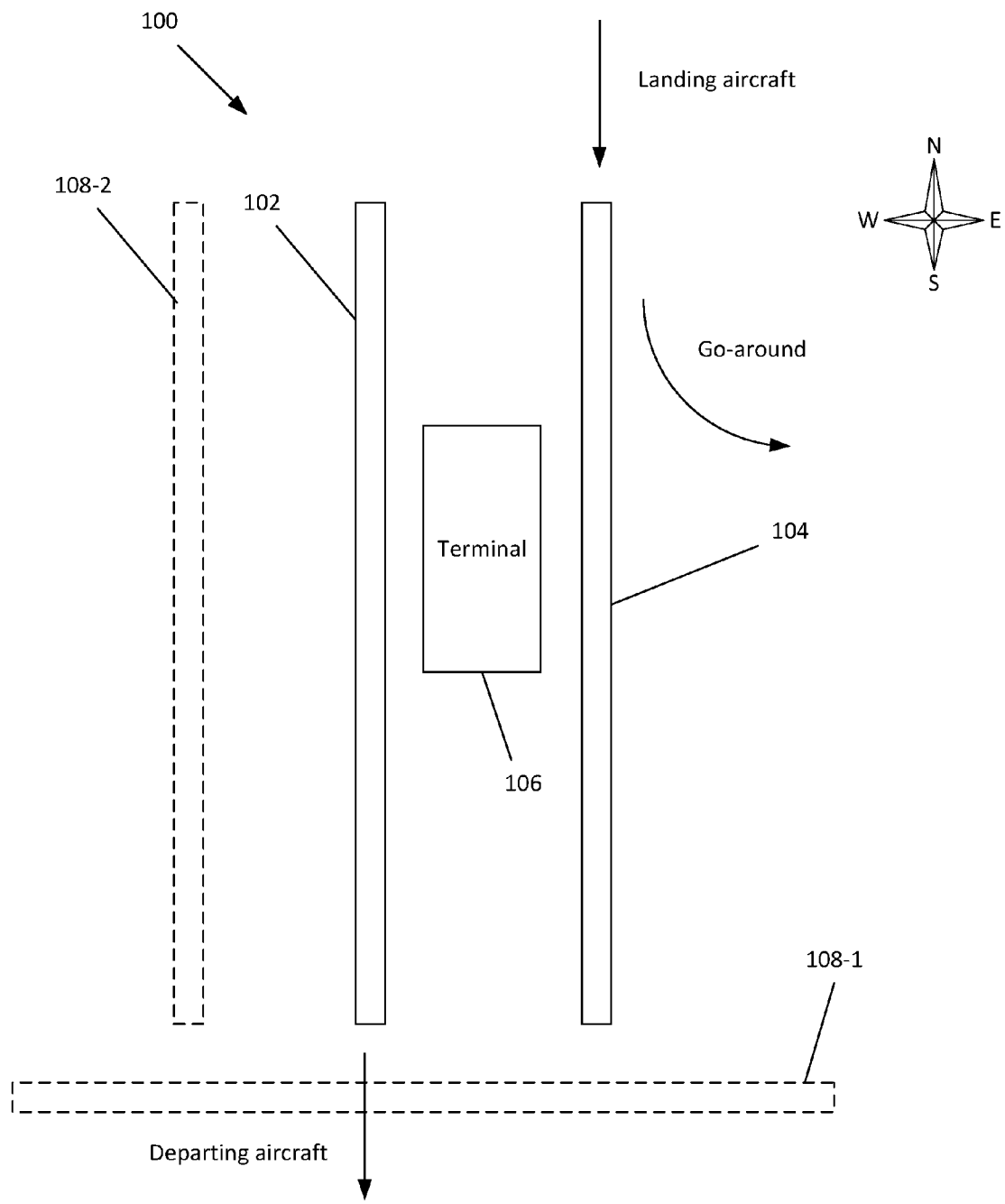
FIG. 1 is an example of an existing airport arrangement.

FIG. 1 shows an example of an existing airport arrangement 100 using two runways 102, 104. This arrangement is common where the two runways 102, 104 are sufficiently far apart so as not to interfere with one another's operations during normal use, and each runway is close to the terminal 106, or alternatively an aircraft-parking stand. Each runway is often designated as a landing or take-off runway, or as mixed mode where aircraft use the same runway for both landing and taking off in turn, with the aircraft moving in the same direction. Such designations may not be permanent, and, for example, may be dependent on time of day or wind conditions.

Adding a third runway (shown by dotted runways 108) to such an existing arrangement would inevitably either interfere with operations, as shown by runway 108-1, or require a long taxi from the terminal 106 or the aircraft-parking stand, as shown by runway 108-2. This arrangement may also require aircraft to cross runway 102 when taxiing between runway 108-2 and the terminal or aircraft-parking stand. Such arrangements of additional runways may also make 'go-arounds' (where an aircraft aborts approach or landing and loops round for another attempt) more dangerous as the aircraft may have to cross the flight path of other aircraft approaching or departing from the other runways.

Figure 2A:
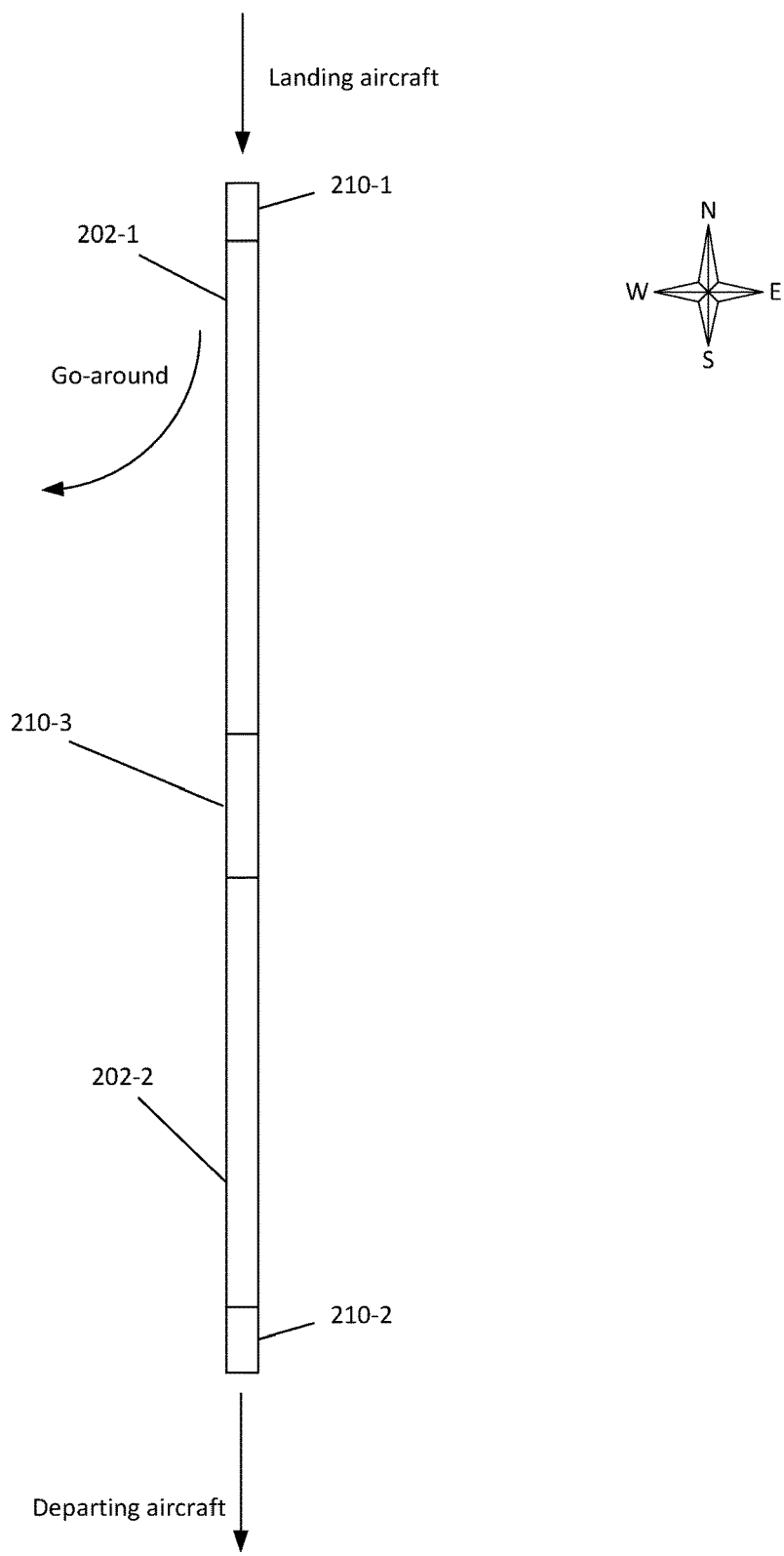
FIGS. 2(a) and 2(b) are examples of a runway arrangement where in-line runways are utilised.

An alternative runway arrangement for commercial, passenger carrying aircraft operating under civil regulations is shown in FIG. 2(a) where a single runway is split into two sections 202-1, 202-2 separated by an intermediate area 210-3. In the example shown, the first runway section 202-1 is used as a landing runway and the second runway section 202-2 is used as a take-off runway. The total runway length of this arrangement is longer than those shown in FIG. 1 to allow aircraft to simultaneously land and take-off from each section of the runway. Safety areas 210-1 and 210-2 are provided as required by regulatory and safety authorities at each end of the runways (where they may be called Runway End Safety Areas (RESAs)) to reduce the risk of damage to aircraft in the event of an undershoot, overshoot, or excursion from the runway. A similar intermediate safety area 210-3 to fulfil the same purpose (that is, preferably, to reduce the risk of damage to aircraft in the event of an undershoot, overshoot or excursion from the runway, as appropriate, of aircraft) is provided at the boundary between the two sections of runway.

A "go-around" is shown in FIG. 2 (a) indicating how landing aircraft turn away from the runway in the event of an aborted approach or landing. This occurs at the start of the landing section 202-1 and therefore avoids conflict with departing aircraft.

FIG. 2(a) shows equal length runway sections each side of the intermediate safety area. However, the position of the intermediate safety area is not fixed, allowing the length of the runway sections each side to be increased or decreased in length according to operating requirements. Preferably, the safety areas 210 are adjustable with respect to their dimensions and/or positions depending on the wind direction and spatial requirements of landing and departing aircraft.

This runway arrangement can also be used in the opposite direction of operation, i.e. the runway section 202-1 being used as a take-off runway and section 202-2 being used as a landing section. Preferably, in use, the directions of operation of the runway sections 202 are switchable.

Figure 2B:
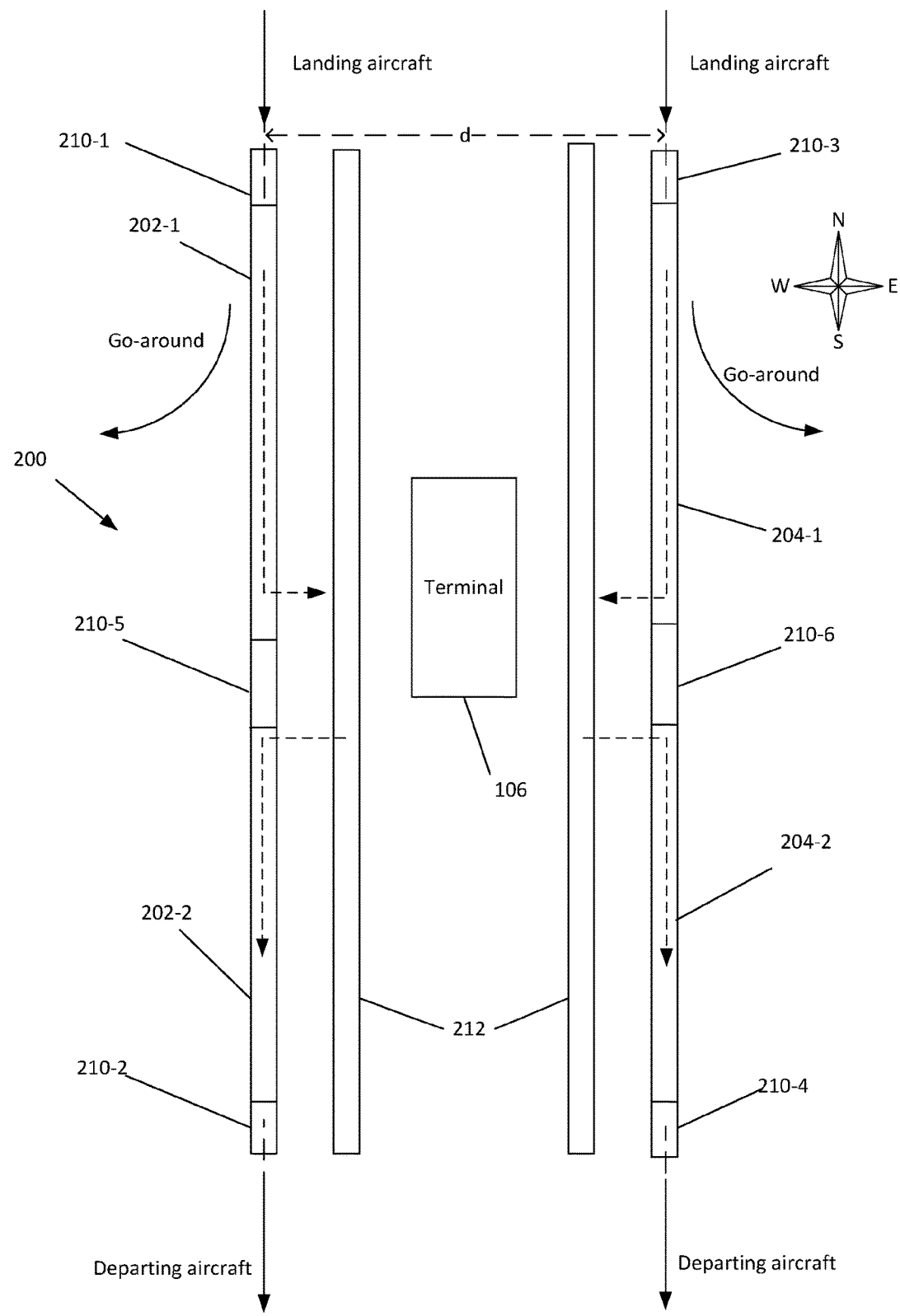
Figure 3A:
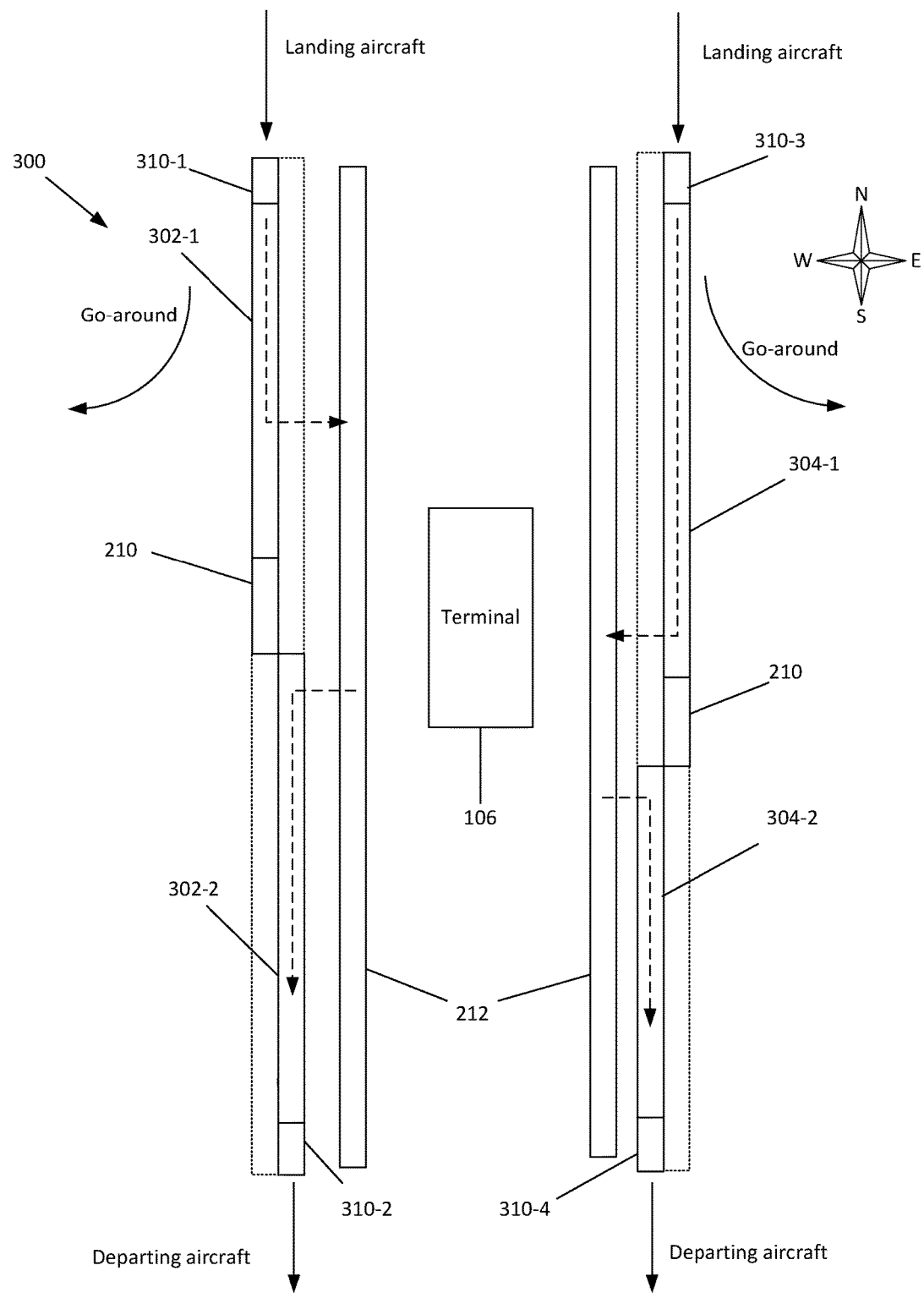
FIGS. 3(a), 3(b), 3(c) and 3(d) show the operation of an alternative runway arrangement where offset runways are used.
Figure 3B:
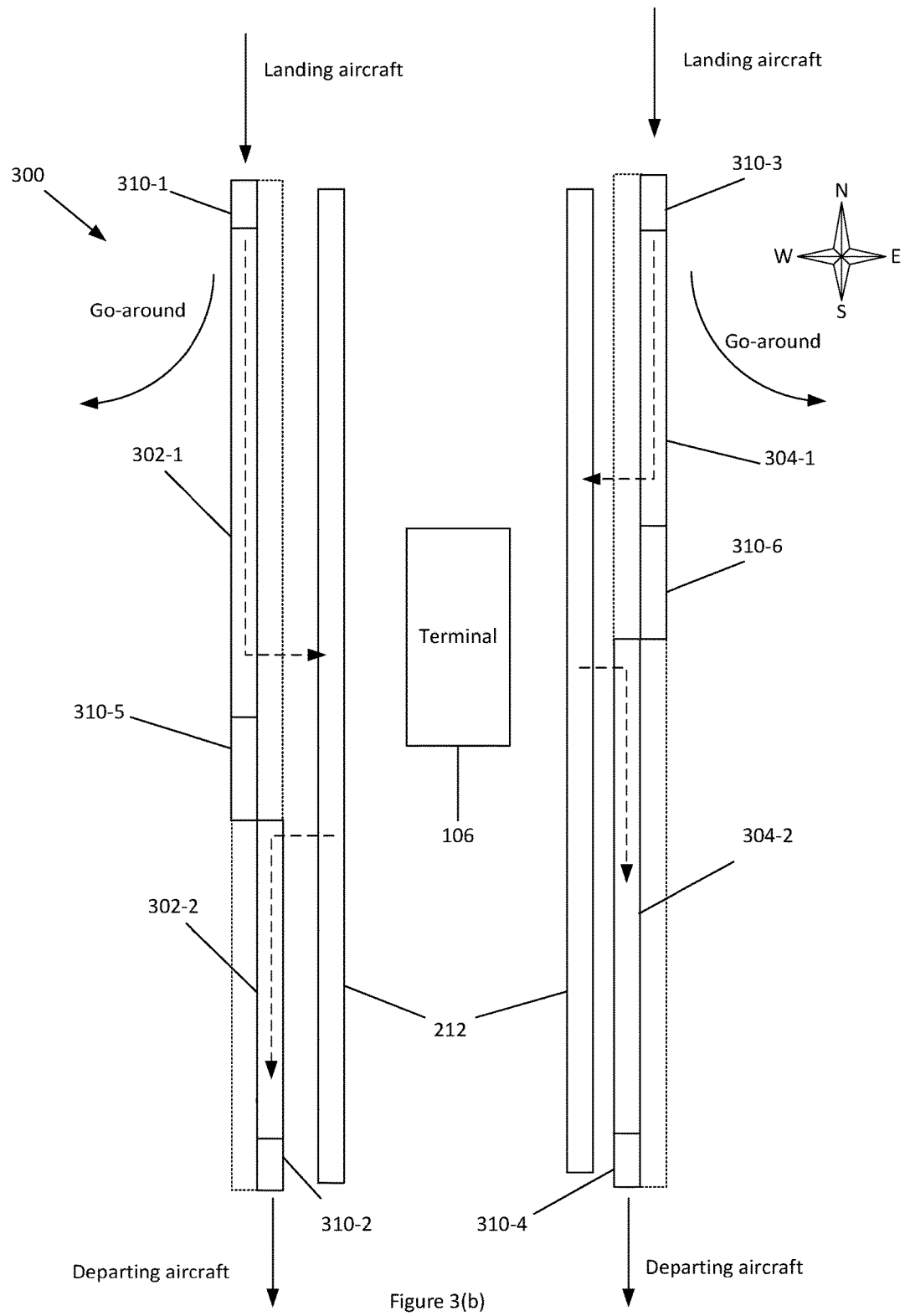
Figure 3C:
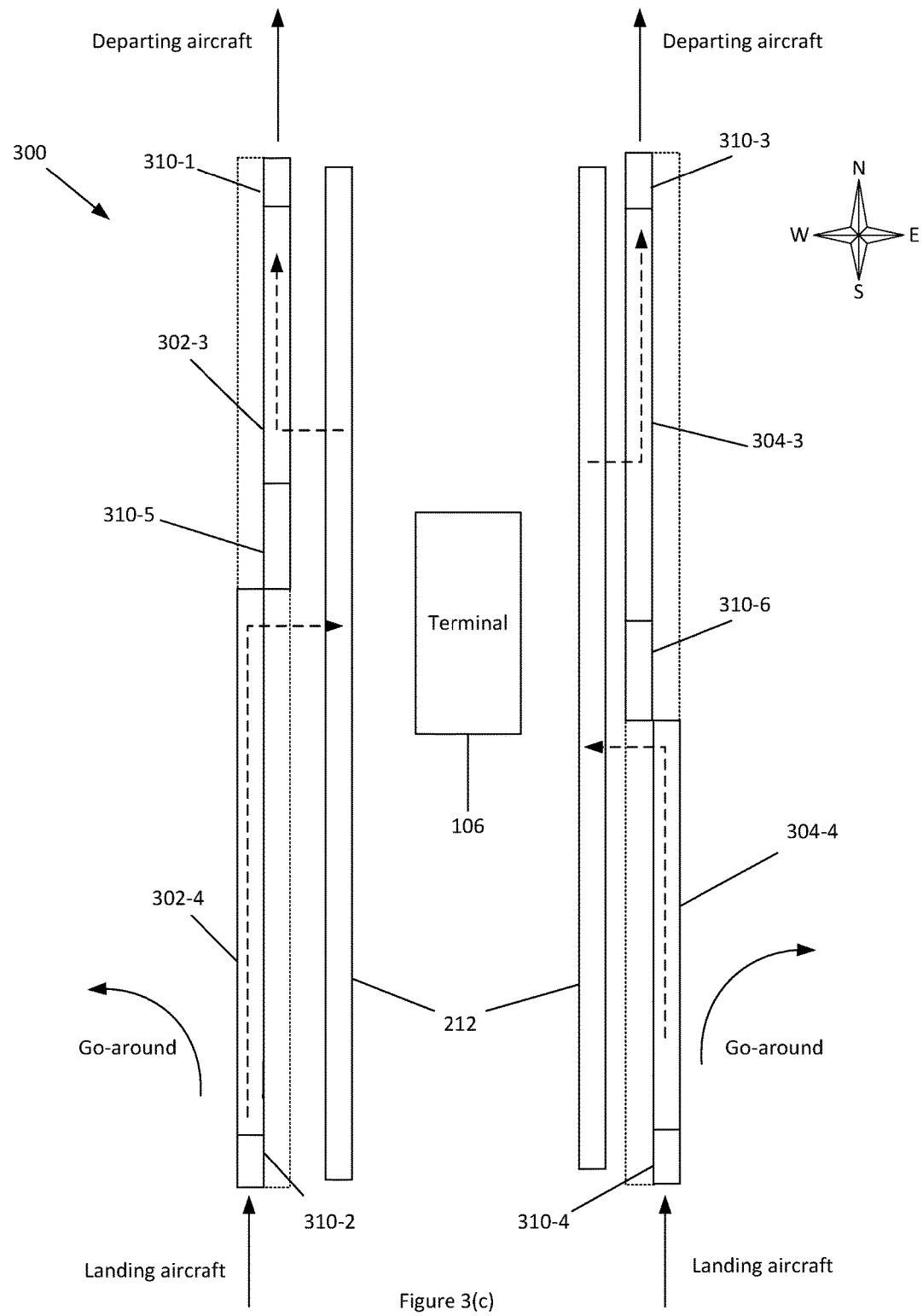
Figure 3D:
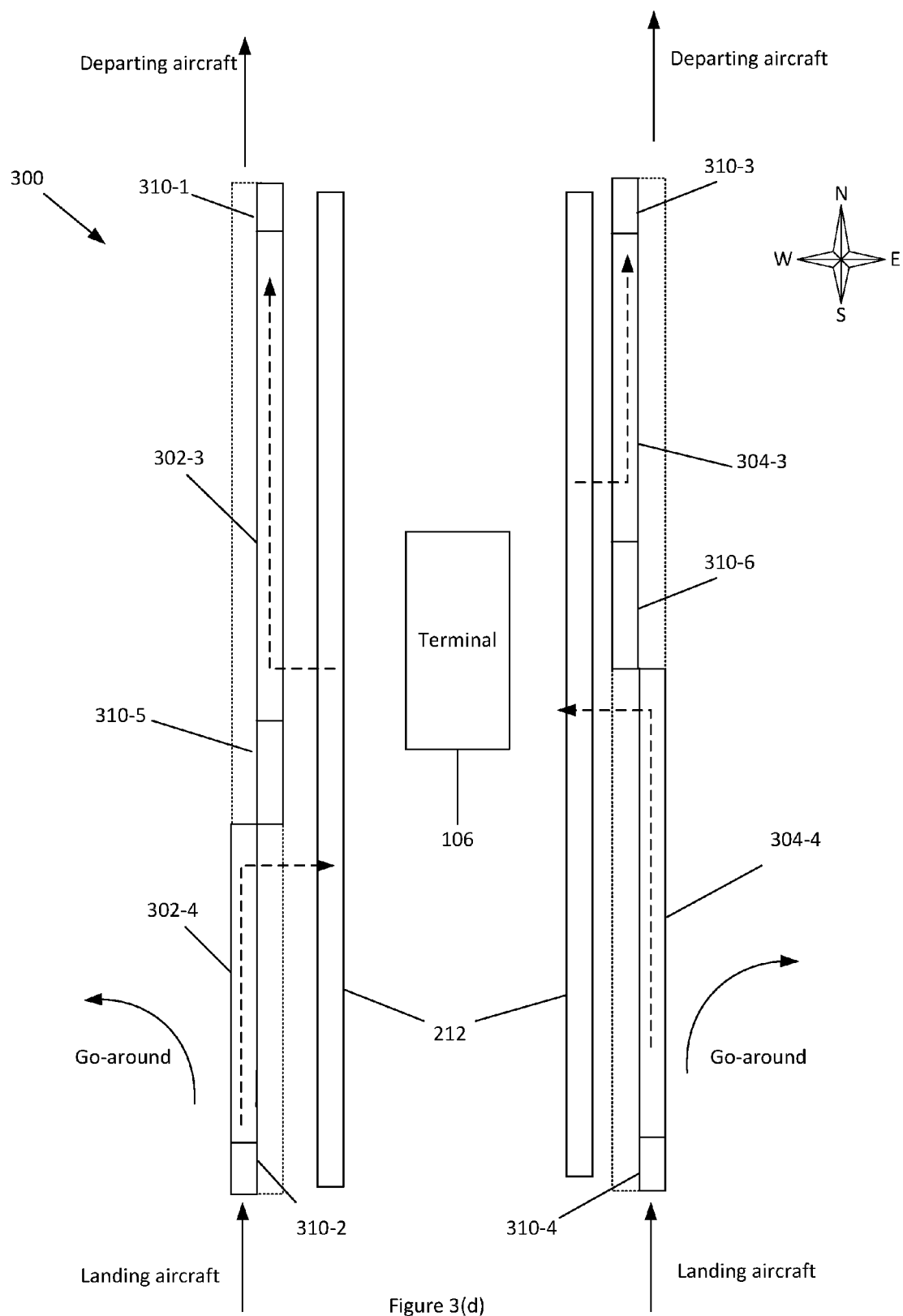

A runway arrangement for commercial, passenger carrying aircraft operating under civil regulations, identified generally by the reference numeral 200, where a pair of runways is provided, is shown in FIG. 2(b). In the example shown, the first runway sections 202-1 and 204-1 are used as landing runways and the second runway sections 202-2 and 204-2 are used as take-off runways. The total length of each runway of this arrangement is longer than those shown in FIG. 1 to allow aircraft simultaneously to land and take-off from each section of the runway.

Safety areas 210-1, 210-2, 210-3 and 210-4 are provided as required by regulatory and safety authorities at the each end of runway (where they may be called Runway End Safety Areas (RESAs)) to reduce the risk of damage to aircraft in the event of an undershoot, overshoot, or excursion from the runway. A similar intermediate safety area 210-5 and 210-6 to fulfil the a similar purpose and to allow fully independent operation of the two runway sections 202-1, 202-2 is provided at the boundary between the two sections of runway. Each section of runway is suitably marked so that aircraft pilots can see where the section of runway designated respectively for arriving and departing aircraft starts and finishes. A person skilled in the art would realise that a wide variety of runway markings and lighting that are currently known in the art would be suitable. Preferably, the safety areas 210 are movable/variable by adjusting the associated markings (e.g. lighting) on the runway. Preferably, the safety areas 210 are sterile under normal operation, in that the areas are free from on-ground aircraft, including any aircraft that are taxiing or being maneuvered. Preferably the safety areas 210 are free from aircraft that are taxiing or being maneuvered across the runway.

In one example, one and the same intermediate safety area is used for landing and take-off. If, in an emergency, such as an overshoot, a longer portion of runway is needed, then the intermediate safety area (typically in the form of a set of runway markings, for example lights) is varied so as to designate a longer portion of runway. In one example (with the figures given being approximate to the nearest 5 or 10%), a runway that is 6400 m long in total has a 2800 m long first runway portion, an intermediate safety area 400 m in length and a second runway portion that is 3200 m in length. Alternatively, there is a 2600 m long first runway portion, an intermediate safety area 600 m in length and a second runway portion that is 3200 m in length. In a further alternative example, there is a 2800 m long first runway portion, an intermediate safety area 600 m in length and a second runway portion that is 3000 m in length. In each of the above examples, at least two sets of markings are used in order to accommodate adjustments to the length of the runway and/or the direction of operation of the runway arrangement. The take-off runway length is available to be made longer by the length of the intermediate safety area (e.g. an additional length of 600 m or 400 m as per the above examples) or a portion of the length of the intermediate safety area, since the intermediate safety area is preferably redundant for take-off, but is preferably required for landing. The designation of the intermediate safety area is varied for different directions of operation of the runway arrangement. Preferably, there are at least two intermediate safety areas or four intermediate safety areas in two, preferably contiguous, pairs (for example, one pair for Westward operations and another pair for Eastward operations). Preferably, the intermediate safety area is available to be partitioned into a plurality of component portions so as to allow greater granularity in the adjustment of the intermediate safety area and the length and/or position of runway sections.

FIG. 2(b) shows equal length runway sections each side of the intermediate safety area 210-5 and 210-6. However, the position of the intermediate safety area is not fixed, allowing the length of the runway sections each side to be increased or decreased in length according to operating requirements.

A "go-around" is shown for both landing runways in FIG. 2(b) indicating how landing aircraft turn away from the runway in the event of an aborted approach or landing. This occurs at the start of the landing sections 202-1 and 204-1 and therefore avoids conflict with departing aircraft.

This runway arrangement can also be used in the opposite direction of operation, i.e. the runway sections 202-1 and 204-1 being used as take-off runways and sections 202-2 and 204-2 being used as landing runways. Reversing the direction of operation of the runways in this way would be particularly advantageous where the wind direction changes or different directions of approach are preferred at different times of day, for example to limit aircraft noise on areas around the airport. Flexibility in the adjustment of the position and/or size of the safety areas 210 helps facilitate dual-direction operation.

Dashed lines show typical aircraft movements on the ground to and from the taxiways 212. A person skilled in the art will appreciate that aircraft ground movements are in reality more complicated than shown but ground movement of arriving and departing aircraft is possible without conflict.

Table 1 below shows dimensions of an example runway arrangement in FIGS. 2(a) and 2(b):

TABLE 1

Example dimensions of elements of a runway arrangement

| Reference numeral | Description | Length |
| --- | --- | --- |
| 202-1, 202-2, 204-1, 204-2 | Runway sections | 2200-3200 m |
| 210-1, 210-2, 210-3, 210-4 | Runway end safety areas | ≥300 m |
| 210-5, 210, 6 | Intermediate safety areas | 300-600 m |
| d | Runway separation | ≥1035 m |

The lengths provided in Table 1 are purely by way of example and depend on various factors such as the type of aircraft that use the runway and the space available. For example, the runway sections may be between 1000 m and 8000 m long, preferably between 2000 m and 4000 m in length. Similarly, the dimensions of the RESAs and the intermediate safety areas may be longer or shorter as defined by local regulatory requirements; in one preferred example they are between 240 m and 600 m in length, but preferably up to 1500 m in length. The intermediate safety area is preferably at least 175 m, 180 m, 200 m, 240 m, 250 m or 300 m in length. Furthermore, the runway separation (d) is often defined by local regulations and may be longer or shorter.

By extending the length of existing runways and taxiways at an airport, the arrangements shown in FIGS. 2(a) and 2(b) can substantially increase capacity without the need to construct entirely new runways which might expose more areas around the airport to aircraft noise. Improving the efficiency of an airport by increasing capacity reduces the need for arriving aircraft to be held in 'stacks' circling whilst waiting for a landing slot, and thus reduces overall $CO_2$ emissions per flight. Furthermore, the runway arrangement shown increases efficiency and capacity, reduces taxiing distances compared to multiple runway layouts, and reduces hold times for aircraft awaiting a take-off slot, which also reduces the $CO_2$ emissions per flight.

The arrangement shown in FIGS. 2(a) and (b) may be somewhat limiting in certain examples if regulatory and safety authorities require departing aircraft to wait for a landing aircraft to slow to a safe speed before the departing aircraft is allowed to enter the take-off section of the runway.

FIG. 3 show an alternative embodiment identified generally by the reference numeral 300, where the landing sections 302-1, 304-1 are offset laterally from the respective take off sections 302-2, 304-2. This reduces the risk of any perceived potential conflict between arriving and departing aircraft. The total width of each runway 302, 304 is greater than that of FIGS. 2 (a) and (b) (say 70 m to 170 m preferably 85 m to 95 m, as opposed to 40 m to 50 m, but in any event as required by the regulatory and safety authorities), whilst runways and taxiway lengths are extended in the same way as those shown in FIG. 2.

This arrangement would be particularly advantageous where an existing runway is wider than is required by the regulatory and safety authorities and can be divided longitudinally to provide two contiguous, parallel runways. Alternatively, the existing runway can be widened, to one or both sides, to provide the required width.

FIGS. 3 (a), (b), (c) and (d) illustrate the ways in which this runway arrangement can be used. FIGS. 3(a) and (b) illustrate two arrangements when Southerly operations are used and FIGS. 3(c) and (d) show the corresponding runway arrangements when Northerly operations are used. In one example, a switch in runway operation modality from that shown in FIGS. 3(a) to 3(c) would represent a change from Southerly to Northerly operations; the designation of the safety areas is adjusted accordingly.

The positions and/or preferably the length of the intermediate safety areas vary as shown by the different arrangements, allowing the length of the runway sections each side to be increased or decreased in length as shown and according to operating requirements. Preferably, the length of the intermediate safety area is dynamically varied in dependence of various factors, including aircraft propulsion blast effects, aircraft performance effects and/or obstacle limitation surfaces (for example, so as to allow a departing aircraft adequate clearance past potential obstacles, such as the tail fin of a ground aircraft). Examples of where different length runways and/or preferably intermediate safety areas would be advantageous is where light/medium aircraft land and take off from shorter sections and large/heavy aircraft land and take off from the longer sections. This arrangement also avoids the problem of smaller aircraft being affected by the vortices produced by large aircraft which have landed/taken off immediately beforehand. The lengths of these sections could be tailored to the exact type of aircraft using the runway arrangement and would not necessarily be permanent. Table 2 shows example dimensions for such a scenario:

TABLE 2

Example dimensions of elements of a runway arrangement

| Reference numeral | Runway type | Length |
| --- | --- | --- |
| 302-1 | Landing - large/heavy | 2500-4000 m |
| 302-2 | Take-off - light/medium | 1000-2500 m |
| 304-1 | Landing - light/medium | 1000-2500 m |
| 304-2 | Take-off - large/heavy | 2500-4000 m |

The lengths provided in Table 2 are purely by way of example and depend on various factors such as the type of aircraft that use the runway and the space available. For example, the overall length of each runway 302, 304 may be between 3000 m and 8000 m, preferably between 4000 m and 6000 m, more preferably approximately 5400 m (excluding intermediate safety areas). In a preferred example the longer runways 302-1, 304-2 are substantially 3200 m long and the shorter runways 302-2, 304-1 are approximately 2200 m long. Preferably, the total length of the runway arrangement is at least 5000 m, 6000 m, 6400 m, 6600 m, 6800 m or 7000 m in length. This may extend the runway arrangement beyond the existing bounds of the airport, possibly into a less densely populated area, which might bring noise advantages as described later in relation to FIG. 7.

Safety areas 310-1, 310-2, 310-3 and 310-4 are provided as required by regulatory and safety authorities at each end of the runway (where they may be called Runway End Safety Areas (RESAs)) to reduce the risk of damage to aircraft in the event of an undershoot, overshoot, or excursion from the runway. A similar intermediate safety area 310-5 and 310-6 to fulfil the same purpose is provided at the boundary between the two sections of each runway. Each section of runway is suitably marked so that aircraft pilots can see where the section of runway designated respectively for arriving and departing aircraft starts and finishes. A person skilled in the art would realise that a wide variety of runway markings and lighting that are currently known in the art would be suitable. Preferably, the safety areas 310 are movable by adjusting the associated markings on the runway.

Preferably, the safety areas 210 are sterile under normal operation, in that the areas are free from on-ground aircraft, including any aircraft that are taxiing or maneuvering, preferably the safety areas 210 being free from aircraft that are taxiing or maneuvering across the runway.

A "go-around" is shown for both landing runways in FIGS. 3 (a), (b), (c) and (d) indicating how landing aircraft turn away from the runway in the event of an aborted approach or landing. Such a manoeuvre may also be called a 'missed approach'. This occurs at the start of the landing sections 302-1 and 304-1 (FIGS. 3 (a) and (b)) and landing sections 302-4 and 304-4 (FIGS. 3 (c) and (d)) and therefore avoids conflict with departing aircraft. The outer pair of runways (302-1 and 304-1 in FIGS. 3(a) and (b) and 302-4 and 304-4 in FIGS. 3(c) and (d)) are designated as landing runways to allow aircraft to turn away from the runway without conflicting with departing aircraft on the inner pair of runways.

In FIGS. 2 and 3 designating areas as safety areas 210 and 310 may comprise physical changes such adding lighting, runway markings and/or software-implemented changes such as alerting pilots and air-traffic controllers to the runway length available via a user interface. These designations may be altered by a user and/or computer system altering the active lighting and/or markings on the runway and making corresponding changes to the user interface display for the pilots and air traffic controllers. Such a system would allow flexibility in the location of intermediate safety areas. Also, in the event of an aircraft needing a much longer runway than usually required, the full length of each runway could be used since the intermediate safety areas, as well as being flexible in location, can also be used as part of the runway if required (in such a scenario, no intermediate safety area is provided). Such an arrangement would however remove the increased capacity gains compared to having two independent, in-line runway sections.

Instrument Landing Systems (ILS), used to aid landing, are typically arranged such that the aerials of the ILS are placed at the distal end of a runway. With reference to FIGS. 2(a) and 2(b), ILS signal degradation is expected due to the distance between a landing aircraft and the ILS aerial, in addition to potential obstruction from departing aircraft. The offset of runway sections 302-1 and 304-1 from runway sections 302-2 and 304-2 respectively, as shown in FIGS. 3(a)-(d), allows the ILS aerials to be preferably placed nearer to landing aircraft, immediately beyond the landing runway section (e.g. runway sections 302-1 and 304-1 in FIG. 3(a)). In this manner, the ILS aerial has free line-of-sight to landing aircraft, is more proximate to landing aircraft and is safely offset from departing aircraft. To improve safety, preferably fixed, but frangible ILS aerial structures are used so as to prevent damage to aircraft, for example in an aircraft landing incident. Additionally, the ILS aerial is low-lying so as to avoid contact with aircraft wings.

FIG. 4(a) shows an alternative method of using the runway arrangements described above. There are often restrictions on airport operations early in the morning or late at night due to the noise involved and the consequent disturbance to the surrounding population.

Figure 7A:
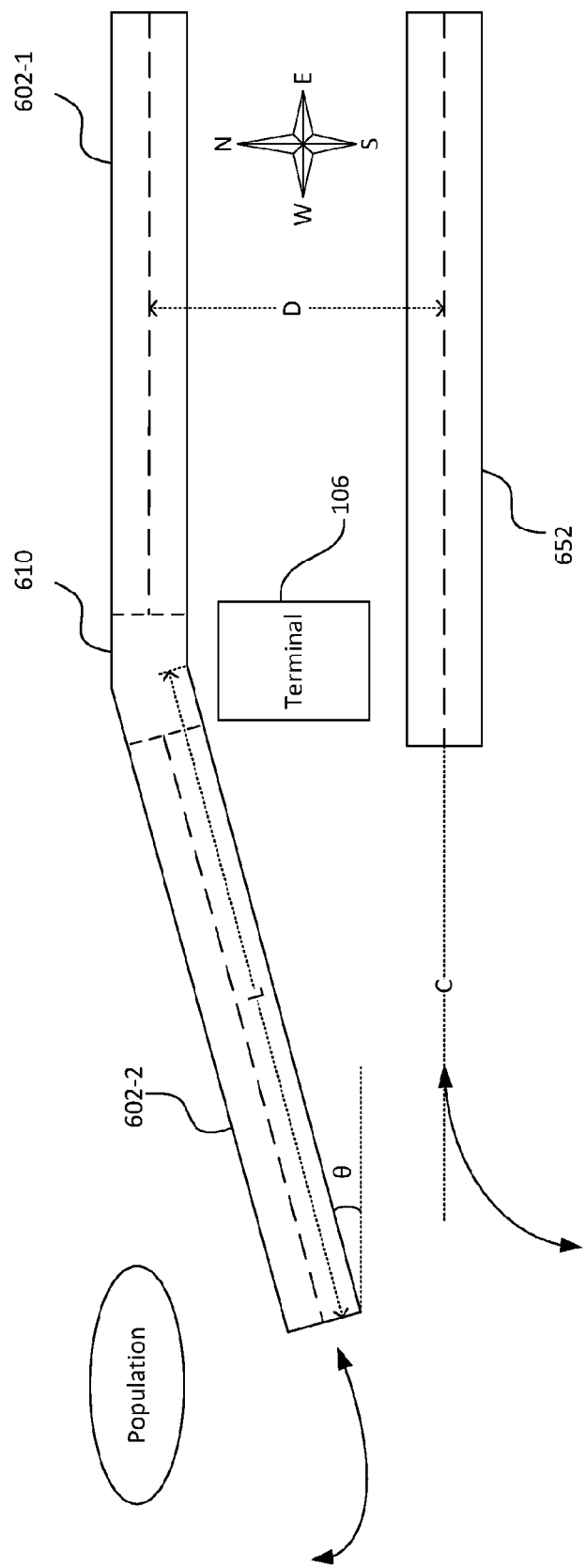
FIGS. 7(a) and 7(b) show the runway arrangement of FIG. 6 with a further runway section.

During times where aircraft are only landing, for example, early mornings, the whole length of one or both runways is available for incoming aircraft. Thus, aircraft can land at the distal end of any runway, thus effectively moving the noise further down the runway. This could be by several thousand meters for a long runway. Thus, the runway is effectively this extra distance further away from the local population, reducing the intensity of the noise for people along the flight path. FIG. 7(a) shows points 700 where aircraft would usually land (see FIGS. 2 to 4 and above) relative to points 702 where aircraft can land if there are no aircraft taking off.

During times when aircraft are only taking off, for example, late evenings, the whole length of one or both runways is available for departing aircraft. Thus, aircraft can similarly start their take off from further down the runway.

FIG. 4(b) shows the effect of this different landing method on a nearby population 704 a distance x away. The normal flight path 706 passes over a point directly above the population 704 at a distance d. When using the 'long landing', where the landing point is offset by a distance Δx, the new flight path 708 is at a distance d+Δd above this same point. This distance is given by the following relationship:

$$\Delta d = \Delta x \cdot \tan \theta$$

Extending the landing point by say 2 km with a descent gradient of 3° therefore means a higher flight path by around 105 m. This has a significant impact on the noise levels at the ground. The further the landing point is extended, the higher the aircraft will be at a given point away from the start of the runway. This distance is limited however by the available runway length; 2 km is merely an example and the distance may be greater or smaller than this depending on the runway being used.

Figure 4:
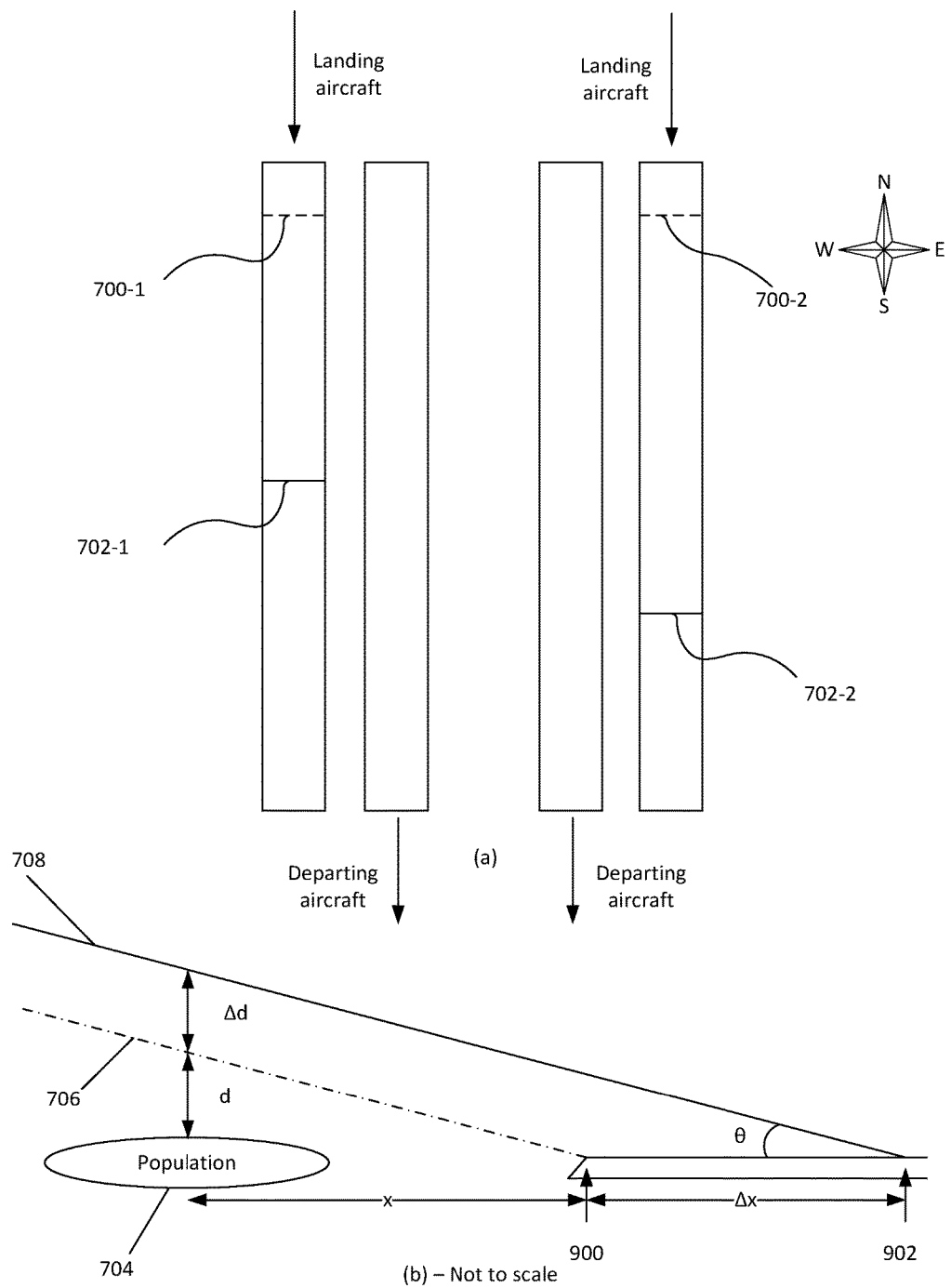
FIG. 4 shows example landing approaches which may be used.

A similar method can be used when taking off so that aircraft have climbed to a greater distance when they pass over a nearby population. In such operation, aircraft begin the take-off at an end of a runway, as opposed to nearer the middle as shown in FIGS. 2 to 4. Such operation would occur independently to aircraft landing.

Designation of landing thresholds and/or safety areas may comprise physical changes such as adding or removing lighting, additional runway markings (such as threshold markings) and/or alerting pilots and air-traffic controllers to the position of the safety areas, runway length and/or position, possibly using software-implemented changes such as alerting pilots and air-traffic controllers to the runway length available via a user interface. These designations may be altered by a user and/or computer system altering the active lighting and/or markings on the runway and making corresponding changes to the user interface display for the pilots and air-traffic controllers. Such a system allows flexibility in the length and/or position of the runway, direction of operation and permits 'long landing' to be facilitated. The full length of each runway could be used since the intermediate safety areas, as well as being flexible in location, can also be used as part of the runway if required.

FIG. 5(a) shows a simplified version of the runway arrangement shown in FIG. 2(a) with detail such as the RESAs omitted for clarity. A first runway section 502-1 and a second runway section 502-2 are linked by a sterile safety area 510, intermediate with the first and second runway sections (hence also referred to as an Intermediate Safety Area (ISA)). The term 'linked', with reference to the sterile safety areas and FIGS. 5-10, is herein used preferably to refer to an area that extends continuously between runway sections (in effect connecting the runway sections), such as the first 502-1 and second 502-2, wherein aircraft are able to, if need be, manoeuvre between the first and second runway sections via the safety area. In one example, the sterile safety area 510 section is between 300 m and 900 m in length, preferably 400 m-600 m in length. The sterile safety area 510 being sterile preferably means that aircraft do not typically use this area for landings, take-offs or taxiing during normal operation. The sterile safety area 510 is therefore free from, preferably on-ground, aircraft movement, typically being reserved for emergency situations.

Figure 5E:
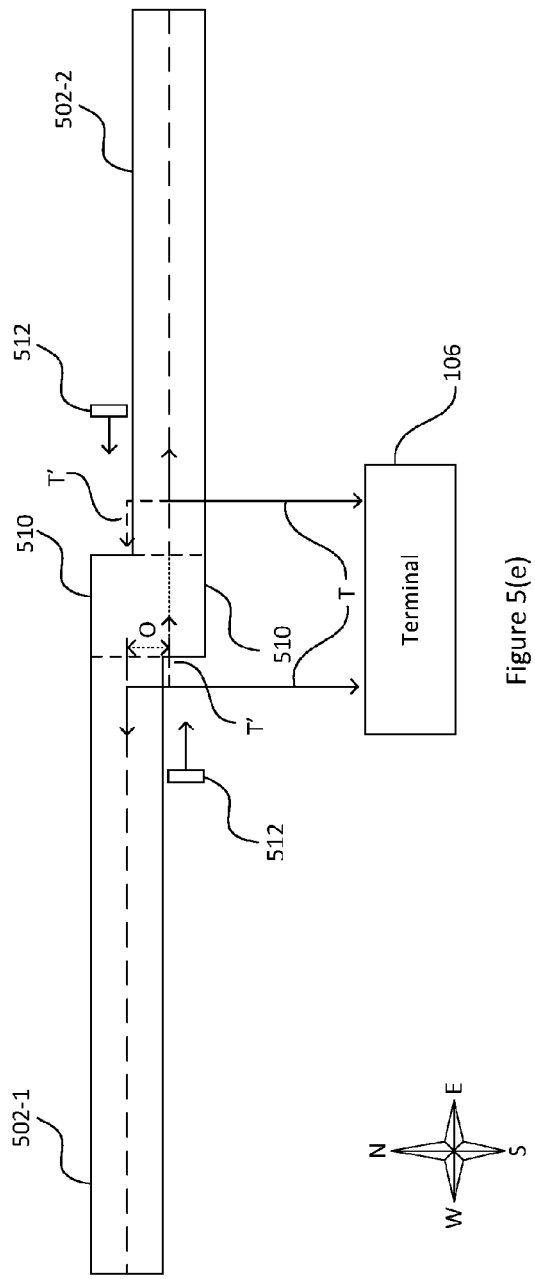

In overview, FIGS. 5(b)-5(e) depict runway arrangements that are modified over that shown in FIG. 5(a), with (in FIGS. 5(b)-5(e)) the first runway section 502-1 laterally offset from the second 502-2.

Specifically, FIG. 5(b) shows a modification of the arrangement shown in FIG. 5(a) whereby the ends of the first and second runway sections 502-1, 502-2 are laterally offset from one another and longitudinally overlap. The first and second runway sections 502-1, 502-2 are laterally offset by a distance O (measured centreline to centreline between the ends of the runway sections). The lateral offset may be beneficial for environmental purposes (for example, by preventing the need for demolition of built-up areas, including residential areas) and providing relief to the local population. For this to be the case, the amount of runway that is not overlapping must be sufficient for an aircraft to land and/or take-off, the overlapping portion being used in emergency situations or for phased landings/take offs (for example for particularly heavy aircraft or during adverse weather conditions). Safety advantages may also arise by shifting flight paths away from populated areas due to the offset in the runway sections.

FIG. 5(c) shows the first runway section 502-1 located closer to the terminal 106 than the second runway section 502-2 is located to the terminal. FIG. 5(d) is related to FIG. 5(c) but shows the first runway section 502-1 located farther from the terminal 106 than the second runway section 502-2 and the first runway section 502-1 extending Eastwards, while the second runway section 502-2 is arranged Westwards. The runway arrangement shown in FIG. 5(c) is used where, for example, the first runway section 502-1 is a pre-existing runway and expansion of the runway arrangement to the West is not feasible (for example, due to geographic or socio-environmental constraints, such as the presence of a reservoir, motorway or built-up area, which may, for example, correspond to Wraysbury, The Queen Mother or King George VI reservoirs; and the M25 motorway, in the case of London Heathrow airport, UK). Conversely, the arrangement shown in FIG. 5(d) is used when expansion of a runway arrangement to the West is feasible (and therefore expansion to the East is not feasible, for example due to the presence of a built-up area, such as Cranford, London, UK in the case of London Heathrow airport) by providing the second runway section 502-2 (and also in which the second runway section 502-2 is provided more proximately to the terminal 106 than there first runway section 502-1). FIG. 5(d) illustrates one example where a single sterile safety area 510-1 extends, from a region coincident with the longitudinally overlapping section (as shown in FIG. 5(b)), between the first 502-1 and second 502-2 runway sections, thereby linking the two runway sections.

In other examples, two distinct sterile safety areas 510-1 and 510-2 are designated, as shown in FIG. 5(c). Each runway section 502 comprises a sterile safety area 510, which in one example is coincident with the overlapping section (as shown in FIG. 5(b)), forming a single sterile safety area. In one example, the longitudinal overlapping section is between 300 m and 900 m in length, preferably between 400 m and 700 m in length, and more preferably between 400 m and 600 m in length.

In normal operation, taxiways T are used (indicated by solid lines) whereby aircraft utilise only the length of the runways not designated as a safety area. In use, aircraft move in the same direction—taking off away from the sterile safety area 510 (for example, with reference to FIG. 5(b), using section 502-1 in Westerly operations and 502-2 in Easterly operations) and land towards the sterile safety area (for example, with reference to FIG. 5(b), using section 502-2 in Westerly operations and 502-1 in Easterly operations). Long landings/take offs, as described above with reference to FIG. 4, can also be performed. More detail relating to the modes of operation is provided below in Table 3.

In exceptional circumstances (for example, where a plane is particularly heavy or due to adverse weather conditions), the entire length of a runway section may be used; however, as discussed above, independent operation may not be possible under such circumstances. The taxiways T used in such circumstances are indicated by dashed lines. For example, in Westerly operations (aircraft moving towards the left of FIG. 5(b)) an aircraft requiring additional runway length to take off may cross the lower runway section 502-2 outside of the sterile safety area 510-2 and utilise the sterile safety area of the upper runway section 502-1 to take off. Similarly, if a greater distance is required to land, an aircraft may utilise the sterile safety area 510-2. An exact analogous arrangement is present when Easterly (towards the right of FIG. 5(b)) operations are being used.

The sterile safety areas 510 are not used for taxiing purposes; aircraft taxi either side of it and only pass through (and completely through) when executing an extended take-off or landing. If the runways are being used in the 'exceptional' mode as described above, departures and landings may need to be phased so as to allow aircraft to cross. For example, and with reference to FIG. 5(c), the second runway section 502-2 is crossed (but not its associated safety area 510-2) to access the proximal end of the first runway section 502-1. This operational restriction makes it less likely that an aircraft is present in the sterile safety area 510 when there is no such phasing (e.g. if a pilot believes he has permission to use an extended runway when the air traffic controllers have not arranged for phased departures/landings).

In another variant (see FIG. 5(e)), the distance (measured from centreline to centreline between the ends of the runway sections) the runway sections 502 may be offset may vary from less than a runway width, for example a quarter of the width of a runway or 10 meters (i.e. so the runway sections 502 laterally overlap, as shown in FIG. 5(e)), up to a distance of approximately double the width of the runway or 100 m. In one example, the lateral separation is a distance of around the width of the first runway section 502-1 so that the runway sections are contiguous. In these two examples, the sterile safety areas 510 of each runway section may be combined into a single sterile safety area 510, as illustrated in FIGS. 5(d) and (e).

In another example, the minimum lateral separation is 60 m to 80 m due to the regulations for runway widths at major airports (or 'code F' runways, as present at Heathrow London airport), or, for example, the clearance surfaces in place at the airport. The greater the lateral separation, the safer the arrangement is for use by aircraft. However, increasing the lateral separation requires a larger total space and distance over which aircraft are required to taxi; therefore a lateral separation greater than, for example, 60 m to 100 m is inefficient.

ILS aerials 512 may be installed at the distal end of each runway sections 502; such placement allows the aerials to be placed sufficiently close to landing aircraft, have free line-of-sight to landing aircraft and be a safe distance from departing aircraft. To improve safety, preferably fixed, but frangible Instrument Landing System (ILS) aerial structures or other operational equipment are used so as to prevent damage to aircraft, for example in an aircraft landing incident. Additionally, the ILS aerials may be low-lying, so as to avoid contact with aircraft wings in case of runway excursions.

Landing guidance systems, such as Microwave Landing Systems (MLS) or other electronic systems, are preferably available to be installed alongside the aforementioned runway arrangements (in addition to or instead of ILS) in order to aid landing. Advantageously, signal interference and restrictions on placement of components of MLS instrumentation, as observed in ILS, are overcome.

FIGS. 5(b)-(e) therefore depict examples of laterally offset runway sections, which are particularly advantageous over laterally aligned runway arrangements, for example as shown in FIGS. 2(a) and 5(a), as built-up areas that lie below a flight path from a runway arrangement that has laterally aligned runway sections may be avoided.

Figure 6:
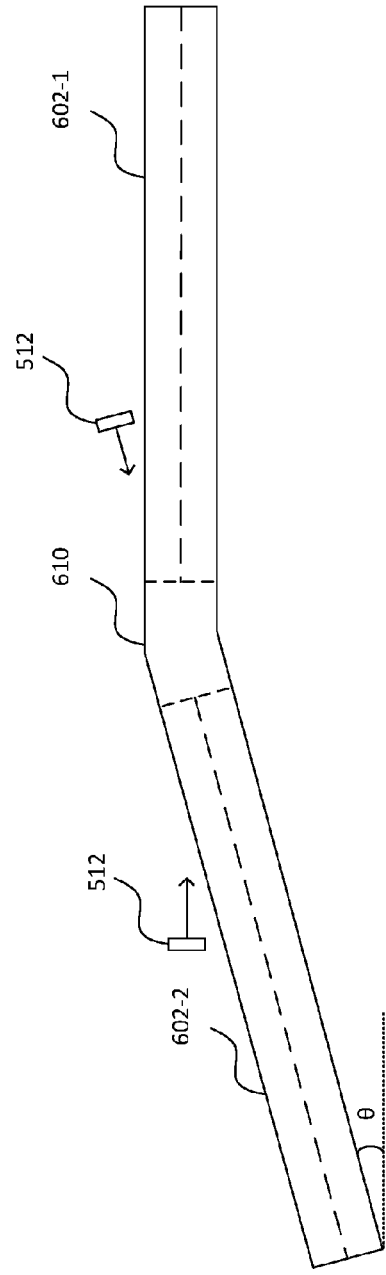
FIG. 6 shows an inline, angled runway arrangement.

FIG. 6 shows a further runway arrangement comprising first and second runway sections 602-1, 602-2, wherein the second runway section 602-2 extends from the first runway section 602-1 at an angle, via a safety area 610 that links the two runway sections. The two runway sections are thus effectively uninterrupted save for the (intermediate) safety area 610. The second runway section 602-2 is disposed at an angle θ to the first runway section 602-1. The angle θ is greater than zero degrees. In one example, where the runway sections apply for example to London Heathrow Airport, UK, the angle θ is between 0.25° and 10°, typically between 0.5° and 8°, preferably between 1° and 5° and more preferably between 2° and 3°. Of course, the angle at which the second runway 602-2 is disposed depends on, amongst other factors, the length of the second runway section and the location of any obstacles (e.g. built-up areas, such as Cranford, London, UK) which are to be avoided. Such an arrangement allows for greater safety as it would be very unlikely for an aircraft to encroach significantly onto the other runway when overshooting the runway end. Furthermore, a slightly canted arrangement reduces the overall length required for the runway arrangement, reducing the additional length of the additional runway section 602-2 by a factor of cos θ.

The example shown in FIG. 6 therefore provides at least the same advantage as the arrangements illustrated in FIGS. 5(b)-(e) in that built-up areas that may otherwise lie below a flight path (based on an arrangement that does not have an angled runway section) may be avoided. Furthermore, positioning the second runway section 602-2 at an angle to the first section 602-1 has a similar advantage to laterally offsetting the sections as described above with reference to FIGS. 5(b)-(e), insofar as ILS aerials 512 can be positioned with a line-of-sight to the landing aircraft.

In overview, FIGS. 7-10 illustrate further examples of runway arrangements that include at least three runway sections and therefore provide the potential for greater aircraft throughput than the examples shown in FIGS. 5 and 6. In all of these examples the example lengths of the various sections provided in Tables 1 and 2 above, or elsewhere with reference to FIGS. 2-4, may apply.

In more detail, FIGS. 7(a) and (b) show runway arrangements that comprise three runway sections, wherein one of the runway sections is substantially parallel and longitudinally aligned and preferably laterally offset from another of the runway sections by a distance D.

As illustrated in FIG. 7(a), if there is a further runway 652 present, the angled runway 602-2 is preferably angled from the first runway section 602-1 towards this further runway 652 so that the additional runway section 602-2 remains within the existing envelope of the airport. This would mean that a population which would have been displaced by the runway extension may not necessarily be so. With reference to FIGS. 7-10, the further runway 652 way be correspond to be the Southern runway of London Heathrow airport and the first runway section may correspond to the Northern runway of London Heathrow airport, or vice versa.

The length (L) and angle (θ) of the additional runway section 602-2 is determined by a number of factors:

1. The separation (D) between the two parallel runway sections 602-1, 652.

In order for both runways to be used simultaneously, there must be no conflict of approach/departure paths on the two runway sections. At the least, the centreline (C) of the further runway 652 does not intersect with the additional runway section 602-2. For this to be the case, the following inequality must hold:

$$D > L \cdot \sin(\theta)$$

As D is likely to be fixed by the pre-existing runway arrangement, this inequality puts upper limits on L and θ. In order to maximise L and θ whilst maintaining safe approaches/departures, curved approaches/departures may be used (as illustrated—in an exaggerated fashion). The parameters of the curved approach/departure vary in dependence on the speed, size, and distance from the centreline of the runway, of the aircraft. The angle of bank for a curved approach/departure changes with wind speed (as an aircraft's air speed changes, but groundspeed does not). Typically, the diameter of a curved approach/departure is about 1,000 m-2,000 m.

2. The proximity to terminals 106 and other infrastructure.

If pre-existing infrastructure (such as terminals 106) is to be retained, this places restraints on the angle (and starting point) of the additional runway section 602-2. In particular, the height of pre-existing infrastructure may be determinative of the angle θ and/or the starting point of the additional runway section 602-2; this is typically governed by regulation; for example, an approach/departure slope of approximately 1 in 7 starting 60 m out from the runway may be adopted.

Figure 7B:
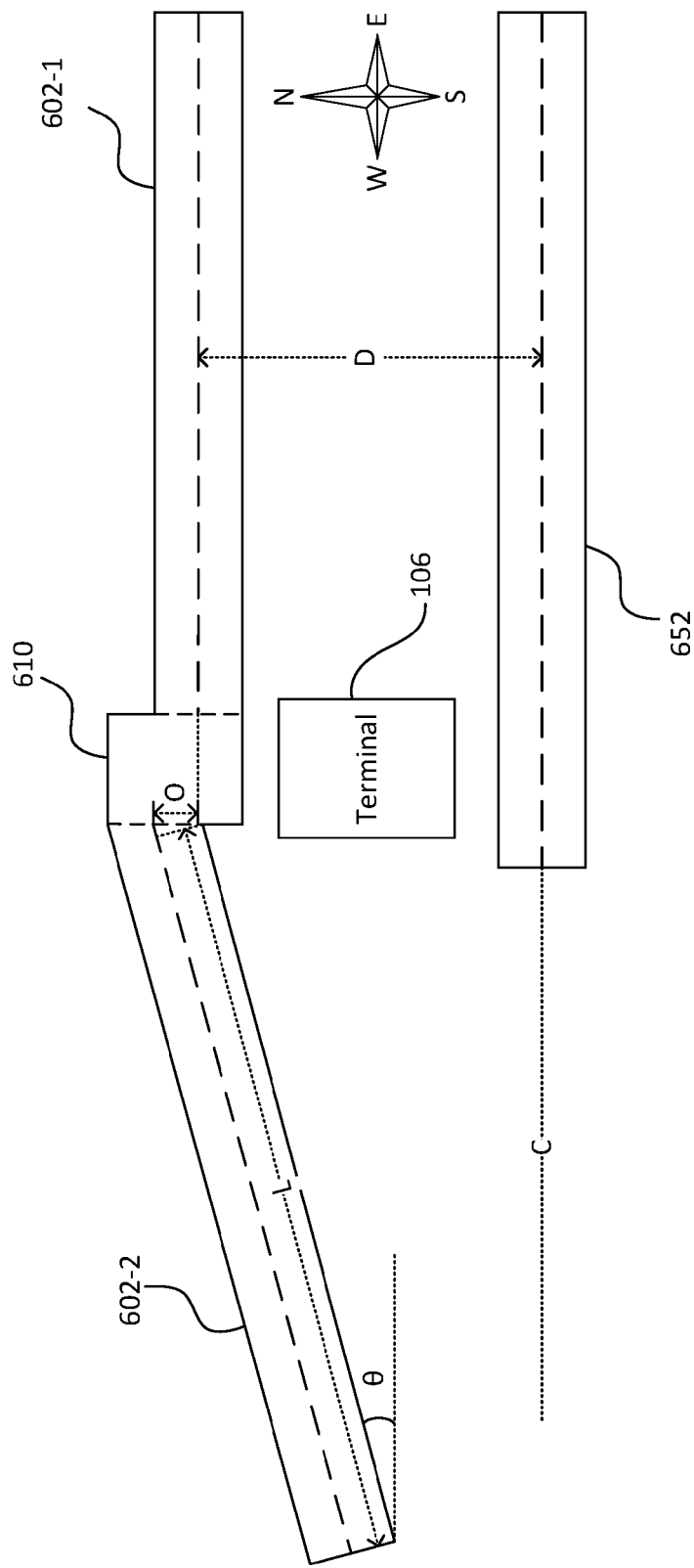

These requirements may be circumvented to an extent by laterally offsetting the second (angled) runway section 602-2 to the first runway section 602-1. FIG. 7(b) shows an arrangement where the centrelines of the second runway section 602-2 are laterally offset from the centreline of the first runway section 602-1 by a distance O (measured centreline to centreline between the ends of the runway sections). This changes the equality above to the following:

$$D + O > L \cdot \sin(\theta)$$

When considering the case where D is fixed, the greater O is, the larger the angle or length of the second runway section 602-2 may be without interfering with the first and the further runway sections 602-1, 652. As O increases, the chances of an aircraft overshooting onto the first runway section 602-1 decreases. However, the greater O is, the further aircraft need to taxi and more (or different) land is required for the runway arrangement. A distance of preferably a quarter to double the width of one runway and more preferably substantially one runway width (e.g. 40 m-75 m would be an appropriate compromise in one example.

FIGS. 8(a)-(d) show 'y-shaped' runway arrangements that comprise three runway sections and thus allow airport capacity to be improved further or offer alternative approach/departure paths for aircraft in order to provide relief to nearby populations.

Specifically, FIG. 8(a) shows a further runway arrangement comprising a second runway section 602-2 disposed at an angle to the first section 602-1, and a third runway section 602-3 substantially in prolongation of the first runway section 602-1, thereby preferably forming a 'y-shaped' runway arrangement. This further arrangement may be considered as FIG. 6 superimposed onto that of FIG. 5(a), and indeed this may be the manner in which the arrangement is constructed.

The arrangement shown in FIG. 8(a) allows for two different approach/departure paths (i.e. along runway sections 602-2 or 602-3), providing relief to the local population who would otherwise have been continually disturbed by one approach/departure path. For example, runway sections 602-2 and 602-3 are used on alternating days of the week. If the curved approaches/departures illustrated in FIG. 7(a) are also used, this advantage is magnified (e.g. by periodically varying the curvature of the approach/departure).

The third runway section 602-3 comprises a sterile safety area 610 which overlaps with the sterile safety area between the first and second runway sections. Preferably, a single section of the runway arrangement positioned at the intersection of the three runway sections is reserved as a sterile safety area 610 which aircraft can only use in exceptional circumstances. All three runway sections 602 are thereby linked by the common safety area 610.

When the arrangement is being used in Westerly operation (i.e. for Westward-bound aircraft landing on section 602-1), aircraft can use either of runway sections 602-2 or 602-3 to take off. If two aircraft not requiring a full length need to take off (for example, small or lighter aircraft), it would be possible for both these aircraft to take off simultaneously without interfering with landing aircraft on the first runway section 602-1. Each aircraft would taxi to a take-off point 800-2, 800-3 on the respective runway section. These points are positioned at a point towards the West of the runway sections, at a distance far enough along so that relative angle of the runway sections means that the aircraft are laterally separated. This distance 'A' is dependent on the angle θ and also local regulatory requirements for wing-tip clearance, in particular so as to avoid wing tip vortices from one aircraft disturbing the other (for example, based on distances governed by regulation).

A modification to the arrangement shown in FIG. 8(a) is shown in FIG. 8(b) where the third runway section 602-3 is laterally offset from the second runway section 602-2, the direction of lateral offset being opposite to the angle that the second runway section 602-2 is disposed. The first and third runway sections 602-1, 602-3 are laterally offset by a distance O' (measured centreline to centreline between the ends of the runway sections). This arrangement may be considered as FIG. 6 superimposed onto that of FIG. 5(b), and indeed this may be the manner in which the arrangement is constructed.

The sterile safety areas 610, 610-3 (which may be combined as a single sterile safety area, as shown in FIG. 5(d), thereby linking the three runway sections) are not used for taxiing purposes; aircraft taxi either side of it, only passing through (and completely through) when executing an extended take-off or landing. If the runways are being used in the 'exceptional' mode, departures and landings may need to be phased so as to allow aircraft to cross the runway. This operational restriction makes it less likely that an aircraft is present in the sterile safety area 610 when there is no such phasing (e.g. if a pilot believes he has permission to use an extended runway when the air traffic controllers have not arranged for phased departures/landings).

The lateral distance the runway sections 602-3 and 602-1 may be offset may vary from a distance less than a runway width (i.e. so the runway section 602-3 overlaps with the other runway sections), for example from a quarter of the width of the runway sections 602-1, 602-2 or 602-3, up to a lateral distance twice the width of the runway section 602-1, 602-2 or 602-3, preferably between a distance of around 50 m and 100 m and more preferably between 60 m to 80 m. The greater the separation, the greater safety is afforded, yet the total space required is increased, as well as the distance aircraft are required to taxi. If the separation is of a sufficient amount, two aircraft could take off simultaneously using the full length of each runway section 602-2, 602-3 without the need to taxi to points 800 as illustrated in FIG. 8(a).

In normal operation, taxiways T are used (indicated by solid lines) whereby aircraft utilise only the length of the runways not designated as a safety area 610.

In exceptional circumstances (for example, where an aircraft is particularly heavy or due to adverse weather conditions), the entire length of a runway section may be used. The taxiways used in such circumstances are indicated by dashed lines. For example, in Westerly operations (aircraft moving towards the left of the Figure) an aircraft requiring additional runway length to take-off may cross the lower runway section 602-1 outside of the sterile safety area 610 and utilise the sterile safety area 610-3 of the third runway section 602-3 to take off. Similarly, if a greater distance is required to land, an aircraft may utilise the sterile safety area 610 and taxi along line T after completely traversing through the sterile safety area 610. Similar taxiways may be used when the arrangement is operating in the opposing (Easterly) direction.

FIG. 8(c) shows an alternative arrangement where the second (angled) runway section 602-2 is also offset from the first runway section 602-1, as shown in FIG. 7(b). This arrangement may suit locations where space is limited as it is particularly compact, whilst still affording the advantage of the offset runways 602-2 and 602-3 making an overshoot onto the first runway section 602-1 less likely.

FIG. 8(d) shows a modification to the runway arrangement shown in FIG. 8(a) whereby an extension 810 to runway section 602-2 has been provided by using a triangle-like filet 820 between runway sections 602-2 and 602-3 on which aircraft may taxi, take-off and/or land. This example allows the runway section 802-2 to be extended without greatly increasing the envelope of the airport.

Figure 9A:
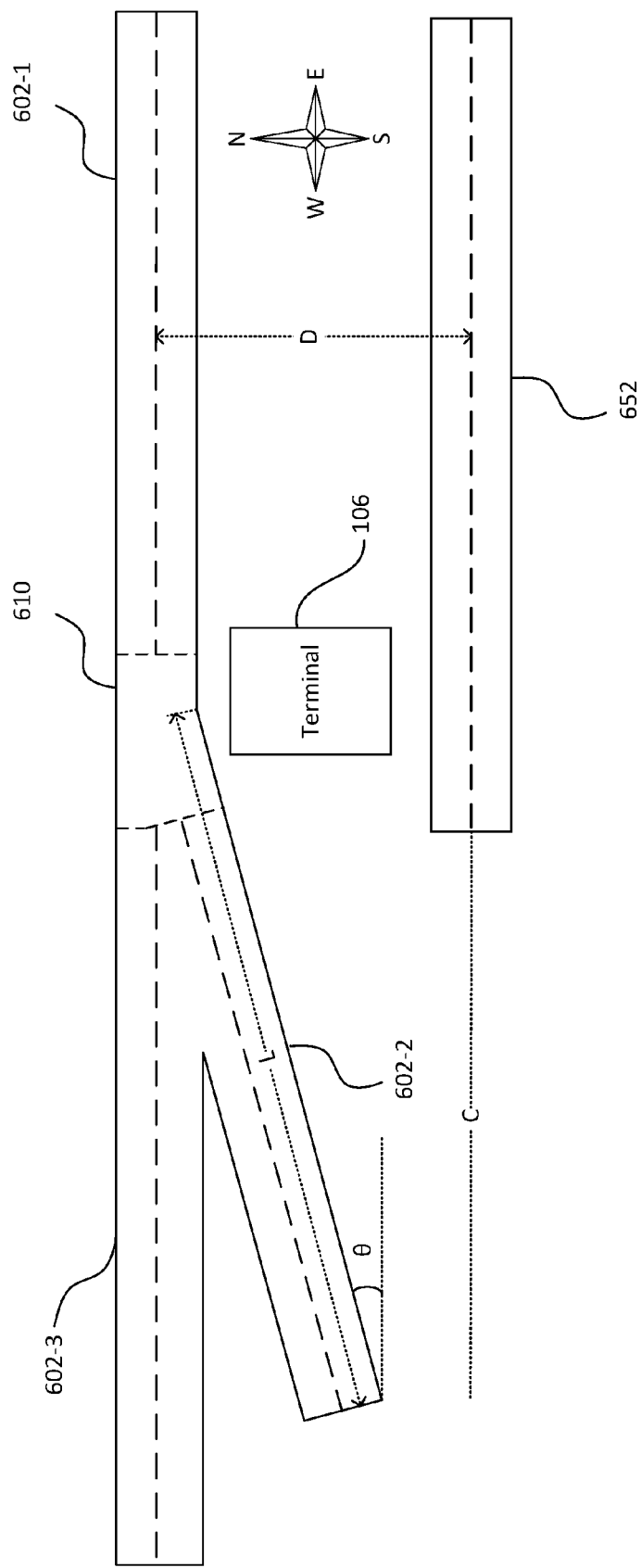
FIGS. 9(a), 9(b) and 9(c) show runway arrangements corresponding to a combination of FIGS. 7(a) and 7(b), and 8(a), 8(b), 8(c) and 8(d)
Figure 9B:
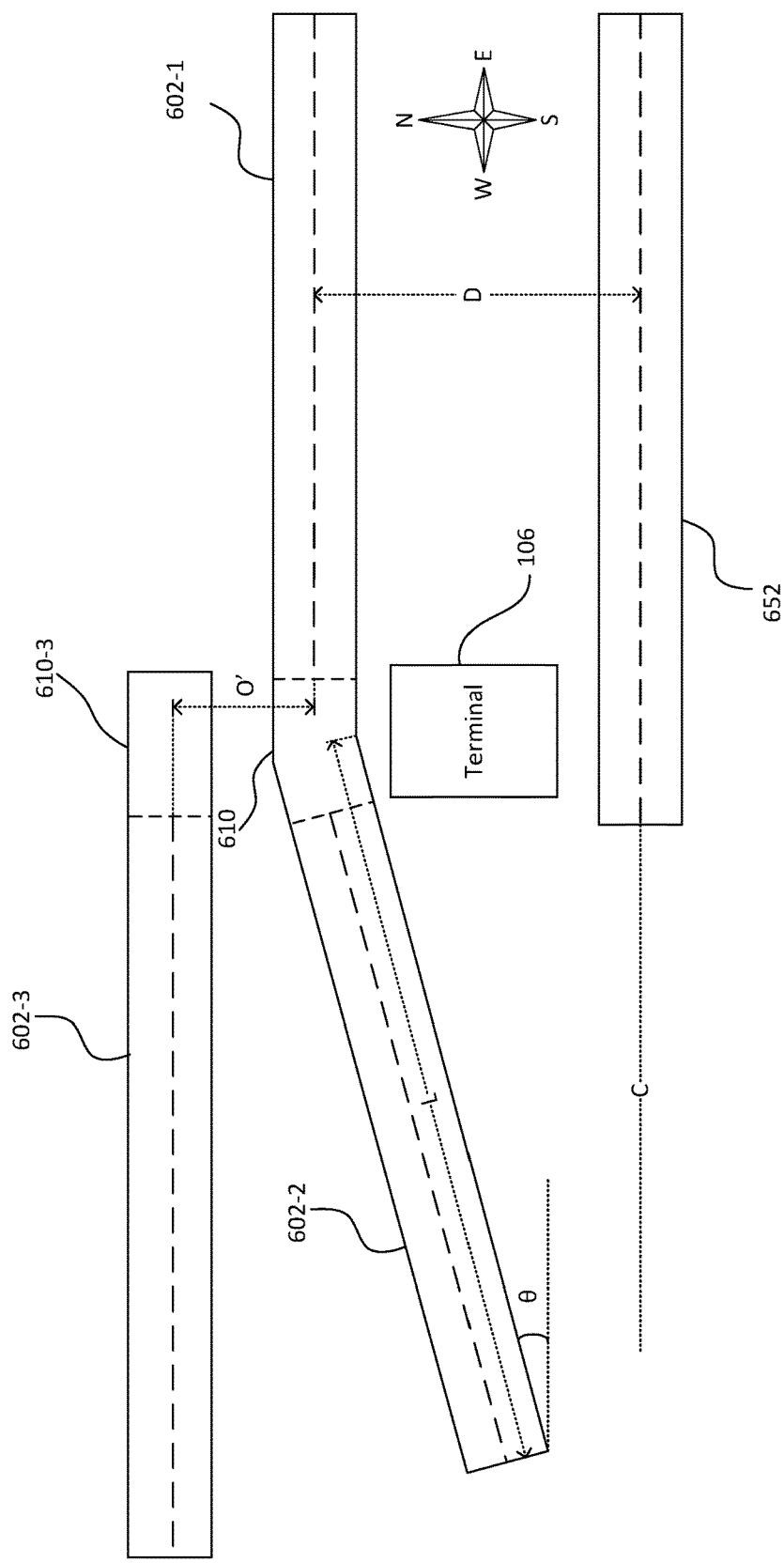
Figure 9C:
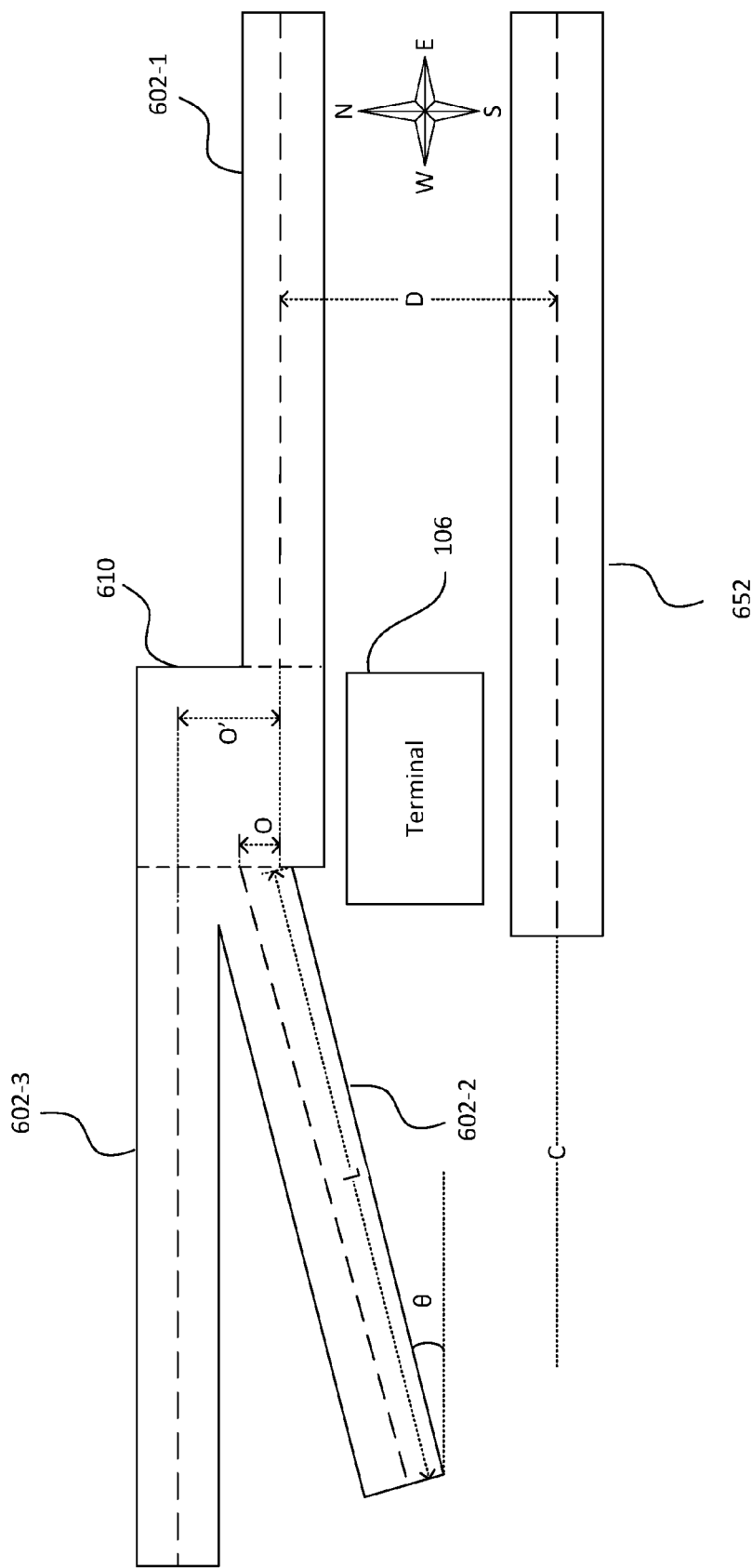

FIGS. 9(a)-(c) show substantially the same 'y-shaped' runway arrangements of FIGS. 8(a)-(d), but with a further runway section 652 (which, in certain circumstances may be a pre-existing runway section, such as London Heathrow airport's Southern runway, along with runway section 602-1) offset by a distance D.

Specifically, FIG. 9(a) illustrates the runway arrangement of FIG. 8(a) with the further runway section 652. This arrangement may be considered as a combination of arrangements illustrated by FIGS. 8(a) and 7(a). A similar arrangement corresponding to a combination of FIGS. 8(b) and 7(a) is shown in FIG. 9(b), and a combination of FIGS. 8(c) and 7(b) is shown in FIG. 9(c). The same restrictions on the length (L), angle (θ) and starting point of the second runway section 602-2 apply to these arrangements as to those described above with reference to FIG. 7.

Figure 10:
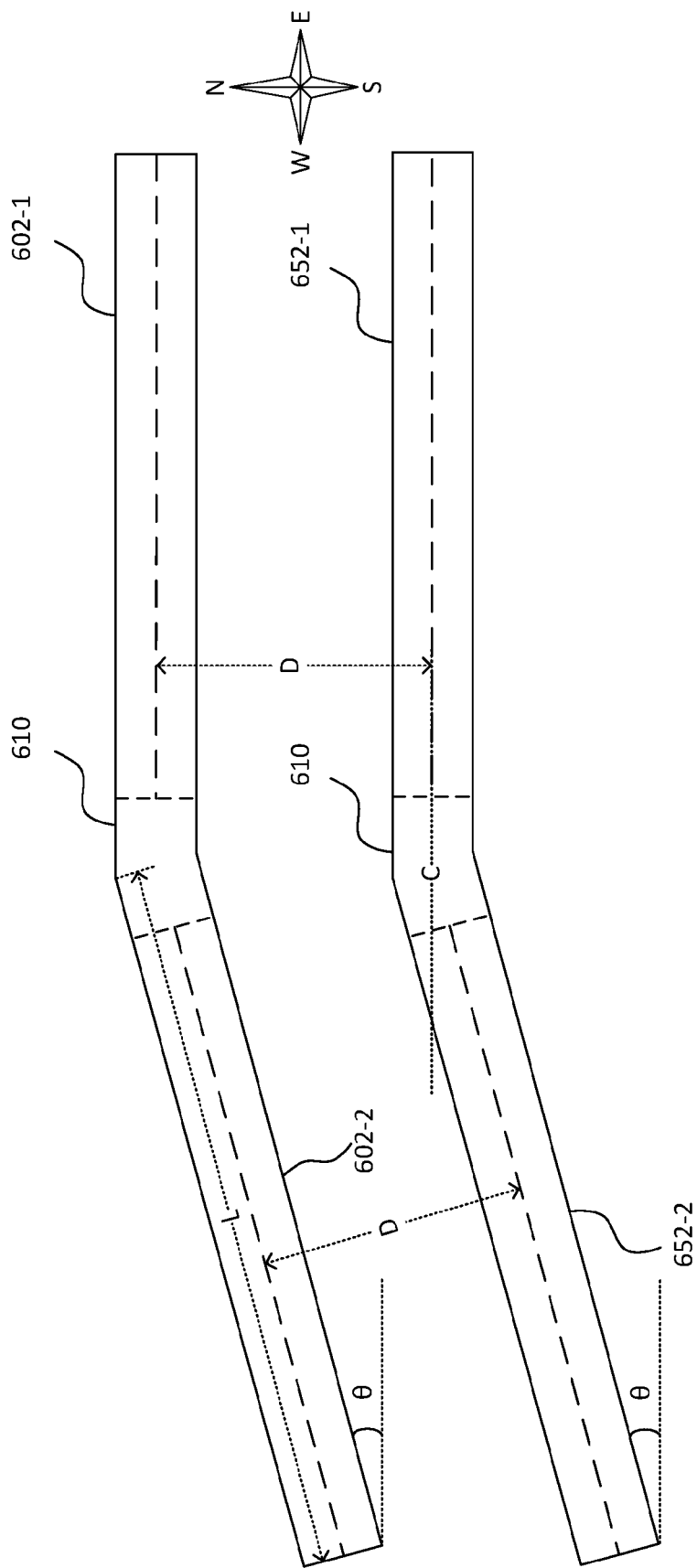
FIG. 10 shows two sets of the inline, angled runway arrangements as shown in FIG. 6.

FIG. 10 shows a set of two, in-line, angled runways (as illustrated in FIG. 6) parallel to one another. In such an arrangement two aircraft can take off simultaneously and two aircraft can land simultaneously. In order for runway sections 652-1 and 602-2 to be used simultaneously, there must be no conflict of approach/departure paths on the two runway sections. The centreline (C) of runway section 652-1 does not therefore intersect with runway section 602-2. For this to be the case, the inequality D>L·sin(θ) must hold true, where D is the distance between the centrelines of runway sections 602-1 and 652-1, L is the length of runway section 602-2, and θ is the angle at which runway section 602-2 is disposed relative to runway section 602-1.

Furthermore, when no aircraft are departing (such as early in the morning) the distal runway sections (e.g. sections 602-1 and 652-1 when landing to the East) can be used for landings so as to lessen the noise to a population close to the airport (as described above with reference to FIG. 4(b)).

Table 3 below illustrates possible modes of simultaneous operation of the various runway arrangements described in FIGS. 5-10 and according modes of controlling air traffic. It should be noted that these example operational modes would be subject to local aircraft legislation and other physical operational requirements such as local topography and weather.

TABLE 3

Modes of Operation

| FIG. & direction of operation | Runway section | Runway section | Runway section | Runway section | Notes |
|---|---|---|---|---|---|
| 5(a); Westerly | 502-1 - Aircraft take off | 502-2 - Aircraft land | NA | NA | Long landings can be made using section 502-1 when no aircraft are taking off. Similarly take offs can be made on section 502-2 when no aircraft are landing |
| 5(a); Easterly | 502-1 - Aircraft land | 502-2 - Aircraft take off | NA | NA | Long landings can be made using section 502-2 when no aircraft are taking off. Similarly take offs can be made on section 502-1 when no aircraft are landing |
| 5(b)/(c)/(e); Westerly | 502-1 - Aircraft take off | 502-2 - Aircraft land | NA | NA | Long landings can be made using section 502-1 when no aircraft are taking off. Similarly take offs can be made on section 502-2 when no aircraft are landing |
| 5(b)/(c)/(e); Easterly | 502-1 - Aircraft land | 502-2 - Aircraft take off | NA | NA | Long landings can be made using section 502-2 when no aircraft are taking off. Similarly take offs can be made on section 502-1 when no aircraft are landing |
| 5(d); Westerly | 502-1 - Aircraft land | 502-2 - Aircraft take off | NA | NA | Long landings can be made using section 502-2 when no aircraft are taking off. Similarly take offs can be made on section 502-1 when no aircraft are landing |
| 5(d); Easterly | 502-1 - Aircraft take off | 502-2 - Aircraft land | NA | NA | Long landings can be made using section 502-1 when no aircraft are taking off. Similarly take offs can be made on section 502-2 when no aircraft are landing |
| 6; Westerly | 602-1 - Aircraft land | 602-2 - Aircraft take off | NA | NA | Long landings can be made using section 602-2 when no aircraft are taking off. Similarly take offs can be made using section 602-1 when no aircraft are landing |
| 6; Easterly | 602-1 - Aircraft take off | 602-2 - Aircraft land | NA | NA | Long landings can be made using section 602-1 when no aircraft are taking off. Similarly take offs can be made using section 602-2 when no aircraft are landing |
| 7(a)/(b); Westerly | 602-1 - Aircraft land | 602-2 - Aircraft take off | 652 - Used in mixed mode - aircraft take off and land to the West in a phased manner | NA | Long landings can be made using section 602-2 when no aircraft are taking off. Similarly take offs can be made on section 602-1 when no aircraft are landing |
| 7(a)/(b); Easterly | 602-1 - Aircraft take off | 602-2 - Aircraft land | 652 - Used in mixed mode - aircraft take off and land to the East in a phased manner | NA | Long landings can be made using section 602-1 when no aircraft are taking off. Similarly take offs can be made on section 602-2 when no aircraft are landing |
| 8(a)/(d); Westerly | 602-1 - Aircraft land | 602-2 - Aircraft take off | 602-3 - Aircraft take off | N/A | Long landings can be made using either section 602-2 or 602-3 when no aircraft are taking off. Similarly take offs can be made using section 602-1 when no aircraft are landing. Sections 602-2 and 602-3 may be used for simultaneous take offs by lighter aircraft using a shorter runway length. |
| 8(a)/(d); Easterly | 602-1 - Aircraft take off | 602-2 - Aircraft land | 602-3 - Aircraft land | N/A | Either section 602-2 or 602-3 is used for landing, not simultaneously. Long landings can be made using either section 602-1 when no aircraft are taking off. Similarly take offs can be made using section 602-2 or 602-3 when no aircraft are landing. |
| 8(b)/(c); Westerly | 602-1 - Aircraft land | 602-2 - Aircraft take off | 602-3 - Aircraft take off | N/A | Long landings can be made using either section 602-2 or 602-3 when no aircraft are taking off. Similarly take offs can be made using section 602-1 when no aircraft are landing. Sections 602-2 and 602-3 may be used for simultaneous take offs using the entire runway length (if offset is sufficient). |
| 8(b)/(c); Easterly | 602-1 - Aircraft take off | 602-2 - Aircraft land | 602-3 - Aircraft land | NA | Either section 602-2 or 602-3 is used for landing, not simultaneously. Long landings can be made using either section 602-1 when no aircraft are taking off. Similarly take offs can be made using section 602-2 or 602-3 when no aircraft are landing. |
| 9(a); Westerly | 602-1 - Aircraft land | 602-2 - Aircraft take off | 602-3 - Aircraft take off | 652 - Used in mixed mode - aircraft take off and land to the West in a phased manner | Long landings can be made using either section 602-2 or 602-3 when no aircraft are taking off. Similarly take offs can be made using section 602-1 when no aircraft are landing. Sections 602-2 and 602-3 may be used for simultaneous take offs by lighter aircraft using a shorter runway length. |
| 9(a); Easterly | 602-1 - Aircraft take off | 602-2 - Aircraft land | 602-3 - Aircraft land | 652 - Used in mixed mode - aircraft take off and land to the East in a phased manner | Either section 602-2 or 602-3 is used for landing, not simultaneously. Long landings can be made using either section 602-1 when no aircraft are taking off. Similarly take offs can be made using section 602-2 or 602-3 when no aircraft are landing. |

TABLE 3-continued

Modes of Operation

| FIG. & direction of operation | Runway section | Runway section | Runway section | Runway section | Notes |
|---|---|---|---|---|---|
| 9(b)/(c) Westerly | 602-1 - Aircraft land | 602-2 - Aircraft take off | 602-3 - Aircraft take off | 652 - Used in mixed mode - aircraft take off and land to the West in a phased manner | Either section 602-2 or 602-3 is used for landing, not simultaneously. Long landings can be made using either section 602-2 or 602-3 when no aircraft are taking off. Similarly take offs can be made using section 602-1 when no aircraft are landing. |
| 9(b)/(c) Easterly | 602-1 - Aircraft take off | 602-2 - Aircraft land | 602-3 - Aircraft land | 652 - Used in mixed mode - aircraft take off and land to the West in a phased manner | Either section 602-2 or 602-3 is used for landing, not simultaneously. Long landings can be made using either section 602-1 when no aircraft are taking off. Similarly take offs can be made using section 602-2 or 602-3 when no aircraft are landing. |
| 10; Westerly | 602-1 - Aircraft land | 602-2 - Aircraft take off | 652-1 - Aircraft land | 652-2 - Aircraft take off | Long landings can be made using sections 602-2 and/or 652-2 when no aircraft are taking off. Similarly take offs can be made using sections 602-1 and/or 652-1 when no aircraft are landing. |
| 10; Easterly | 602-1 - Aircraft take off | 602-2 - Aircraft land | 652-1 - Aircraft take off | 652-2 - Aircraft land | Long landings can be made using sections 602-1 and/or 652-1 when no aircraft are taking off. Similarly take offs can be made using sections 602-2 and/or 652-2 when no aircraft are landing. |

Further to the example modes of simultaneous operation detailed above, it would also be possible to have a mode of operation where just one of the two in-line runway sections is used (for example in mixed-mode, just for take-offs, or just for landings). This may be useful for safety purposes such as when one of the in-line runways is being repaired or cleared of snow; or during periods of infrequent aircraft movement.

Turning to methods of construction, the above-described runway arrangements are constructed by providing the second and/or third runway arrangements according to the arrangements described with reference to FIGS. 5-10. For example, in FIGS. 5(b)-(e), the second runway section 502-2 is provided so that it is laterally offset from the first runway section 502-1. The safety area between the first and the second runway sections is designated, for example as defined by a region where the first and second runway sections longitudinally overlap.

In other examples, such as in FIG. 6, the second runway section 602-2 is provided at an angle to the first runway section 602-1, such that the second runway section 602-2 extends from the first runway section 602-1, via a sterile safety area 610, at an angle relative to the first runway section 602-1. By designating a sterile safety area 610 between the first and the second runway sections, the runway sections are in effect linked by the sterile safety area 610. The steps of providing angled and laterally offset runway sections may be combined in order to construct a runway arrangement as described with reference to FIG. 7(b).

In the example shown in FIG. 8(d), construction of the runway arrangement is conducted by providing a triangle-like fillet 820 to the West of the first runway section 602-1. The fillet 820, which is suitable for aircraft to taxi, take off from and land upon, covers an area in which two further runway sections extending from the first runway section 602-1—the (angled) second runway section 602-2 and the third runway section 602-3—are designated. An extension 810 to the second runway section 602-2 is designated such that the second runway section 602-2 extends across substantially the entirety of the hypotenuse of the triangle-like fillet 820.

Purely by way of example, Table 4 below illustrates the stages of construction of the runway arrangements shown in FIGS. 5-10.

TABLE 4

Methods of Construction

| FIG. | Stage 1 | Stage 2 | Stage 3 | Stage 4 | Stage 5 | Notes |
|---|---|---|---|---|---|---|
| 5(a) | Providing runway section 502-1 | Expanding Eastwards by providing runway section 502-2 in alignment with runway section 502-1 | Designating a safety area 510 between runway sections 502-1 and 502-2 | NA | NA | |
| 5(b) | Providing runway section 502-1 | Expanding Eastwards by providing runway section 502-2, which is offset from runway section 502-1 | Designating longitudinally overlapping safety areas 510-1 and 510-2 | NA | NA | |
| 5(c) | Providing runway section 502-1 | Expanding Westwards by providing runway section 502-2, which is offset from runway section 502-1 | Designating longitudinally overlapping safety areas 510-1 and 510-2 | NA | NA | |

TABLE 4-continued

Methods of Construction

| FIG. | Stage 1 | Stage 2 | Stage 3 | Stage 4 | Stage 5 | Notes |
|---|---|---|---|---|---|---|
| 5(d) | Providing runway section 502-1 | Expanding Westwards by providing runway section 502-2, which is offset from runway section 502-1 | Designating longitudinally overlapping sterile safety areas 510-1 and 510-2 | NA | NA | |
| 5(e) | Providing runway section 502-1 | Expanding Eastwards by providing runway section 502-2, which is offset from runway section 502-1 | Designating safety area 510 between runway sections 502-1 and 502-2 | NA | NA | |
| 6 | Providing runway section 602-1 | Expanding Westwards by providing runway section 602-2 at an angle relative to runway section 602-1 | Designating a safety area 610 between runway sections 602-1 and 602-2 | NA | NA | |
| 7(a) | Providing runway section 602-1 | Providing runway section 652, parallel to and longitudinally aligned with runway section 602-1 | Expanding Westwards by providing runway section 602-2 at an angle relative to runway section 602-1 | Designating a safety area 610 between runway sections 602-1 and 602-2 | NA | Runway sections 602-1, 602-2 and 652 are arranged to satisfy $D > L \cdot \sin(\theta)$ |
| 7(b) | Providing runway section 602-1 | Providing runway section 652, parallel to and longitudinally aligned with runway section 602-1 | Expanding Westwards by providing runway section 602-2 at an angle relative to runway section 602-1 | Designating a safety area 610 between runway sections 602-1 and 602-2 | NA | Runway sections 602-1, 602-2 and 652 are arranged to satisfy $D + O > L \cdot \sin(\theta)$ |
| 8(a) | Providing runway section 602-1 | Expanding Westwards by providing runway section 602-3 | Expanding Westwards by providing runway section 602-2 at an angle relative to runway section 602-1 | Designating a safety area 610 between the runway sections 602-1, 602-2 and 602-3 | NA | |
| 8(b) | Providing runway section 602-1 | Expanding Westwards by providing runway section 602-2 at an angle relative to runway section 602-1 | Expanding Westwards by providing runway section 602-3 | Designating a safety area 610 between runway sections 602-1 and 602-2; and further designating a safety area 610-3 for runway section 602-3, such that safety areas 610-3 and 610 longitudinally overlap | NA | |
| 8(c) | Providing runway section 602-1 | Expanding Westwards by providing runway section 602-3 which is offset from runway section 602-1 | Expanding Westwards by providing runway section 602-2 which is offset and angled relative to runway section 602-1 | Designating a safety area 610 between the runway sections 602-1, 602-2 and 602-3 | NA | |
| 8(d) | Providing runway section 602-1 | Expanding Westwards by providing a triangle-like fillet 820 in prolongation of runway section 602-1 | Designating a portion of the triangle-like fillet 820 as runway section 602-3, which is laterally aligned with runway section 602-1 | Designating a portion of the triangle-like fillet 820 as runway section runway section 602-2 which is angled relative to runway section 602-1 | Designating a safety area 610 between runway sections 602-1, 602-2 and 602-3 | Runway section 602-2 is extendable by providing extension 810 across substantially the entire hypotenuse of the triangle-like fillet 820 |
| 9(a) | Providing runway section 602-1 | Providing runway section 652, parallel to and longitudinally aligned with runway section 602-1 | Expanding Westwards by providing runway section 602-3 | Expanding Westwards by providing runway section 602-2 at an angle relative to runway section 602-1 | Designating a safety area 610 between runway sections 602-1, 602-2 and 602-3 | Runway sections 602-1, 602-2 and 652 are arranged to satisfy $D > L \cdot \sin(\theta)$ |
| 9(b) | Providing runway section 602-1 | Providing runway section 652, parallel to and longitudinally aligned with runway section 602-1 | Expanding Westwards by providing runway section 602-3, which is offset from runway section 602-1 | Expanding Westwards by providing runway section 602-2 at an angle relative to runway section 602-1 | Designating safety area 610 between runway sections 602-1 and 602-2; and designating safety area 610-3 of runway section 602-3, such that safety areas 610-3 and 610 longitudinally overlap | Runway sections 602-1, 602-2 and 652 are arranged to satisfy $D > L \cdot \sin(\theta)$ |
| 9(c) | Providing runway section 602-1 | Providing runway section 652, parallel to and longitudinally aligned with runway section 602-1 | Expanding Westwards by providing runway section 602-3, which is offset from runway section 602-1 | Expanding Westwards by providing runway section 602-2 at an angle relative to runway section 602-1 | Designating a safety area 610 between the runway sections 602-1, 602-2 and 602-3 | Runway sections 602-1, 602-2 and 652 are arranged to satisfy $D + O > L \cdot \sin(\theta)$ |

TABLE 4-continued

Methods of Construction

| FIG. | Stage 1 | Stage 2 | Stage 3 | Stage 4 | Stage 5 | Notes |
|---|---|---|---|---|---|---|
| 10 | Providing runway section 602-1 | Providing runway section 652-1, parallel to and longitudinally aligned with runway section 602-1 | Expanding Westwards by providing runway section 602-2 at an angle relative to runway section 602-1 | Expanding Westwards by providing runway section 652-2 at an angle relative to runway section 652-1, parallel to and longitudinally aligned with runway section 602-2 | Designating a safety areas 610 between runway sections 602-1 and 602-2 and between runway sections 652-1 and 652-2 | The angles of runway sections 602-2 and 652-2 relative to sections 602-1 and 652-2 respectively are substantially equal. Runway sections 602-1, 602-2 and 652-1 are arranged to satisfy $D > L \cdot \sin(\theta)$. |

Runway Thresholds

At any airport there is the possibility of a landing aircraft requiring to touch-down and immediately take off again (a 'missed approach'), possibly due to a failure. In an extreme example, this may have to be performed with the aircraft suffering from an engine failure which would limit its ability to climb following take-off. In a typical runway arrangement, the requirement following a missed approach is to be able to climb to a sufficient height to avoid obstacles around the runway, such as fences or buildings. A 100 ft (30 m) separation above such obstacles is a typical regulatory requirement. In practice, this may result in a 200 ft (60 m) height above the ground as the highest likely object to be cleared is a tail fin of a large aircraft (such as an Airbus A380), which is approximately 30 m high.

During simultaneous operation of an extended runway as described above, stricter requirements may be required for safe independent operation as a second aircraft may be taking off from the distal end of the runway at the same time as the first aircraft is performing a land and take-off manoeuvre on the proximal runway section. This may result in the faulty landing and taking-off aircraft interfering with the departing aircraft prior to turning so as to attempt a further landing (for example on a different runway section). In order to avoid such a scenario, the dimensions and layout of the extended runway arrangement can be tailored so that the possibility of any interference is negligible.

FIG. 11a shows a plan view of a first aircraft 250-1 arriving and having to perform a missed approach on a proximal section of runway 202-1 whilst a second aircraft 250-2 is simultaneously taking off from a distal section of the extended runway 202-2. FIG. 11b a horizontal perspective of the same scenario illustrating the elevation of the aircraft performing the missed approach.

The distance relevant for safety considerations is 'H', the minimum height an aircraft can be before being able to start turning away from the runway line. This minimum height allows the crew to reconfigure the aircraft and become sufficiently established in a stable climb. It should be appreciated that other distances are applicable in other territories and indeed other contexts (for example, particular aircraft or locations where different regulations apply). An aircraft performing a missed approach would typically turn by an angle of at least 20°, preferably at least 40°, so would quickly move away from any potential interference with departing aircraft.

The restriction on the minimum height that must be achieved prior to turning away from the runway arrangement 202 introduces a minimum distance D between the point at which the first aircraft starts its ascent following a missed approach and the point a second aircraft starts its ascent on the distal runway section:

$$D > \frac{H}{\tan\theta_1}$$

The distance D is effectively the separation between the last possible landing threshold on the landing runway section and start of the take-off runway section. This distance may also comprise the (possibly negligible) distance an aircraft travels along the runway beyond the landing threshold before beginning its ascent (as shown by distance $r_1$ in FIG. 11(b)).

For a typical turning minimum height H of 500 ft (152 m—approximately 150 m) and varying $\theta_1$, this gives the following approximate minimum distances for D:

TABLE 5

Example minimum distances between take off points for a variety of different angles of ascent following a missed approach

| $\theta_1$ (degrees) | D (metres) |
|---|---|
| 2 | 4350 |
| 3 | 2900 |
| 4 | 2200 |
| 5 | 1750 |
| 6 | 1450 |
| 7 | 1250 |
| 8 | 1100 |

As illustrated in Table 5, the minimum value of D to provide a safe missed approach varies depending on the angle of ascent following a missed approach. In many of the cases, the minimum value of D would not be set by the safety of such a go-around, rather by the required runway distance and intermediate safety area for a plane to land and come to a safe stop (as is discussed above with reference to FIGS. 2-10).

Figure 12:
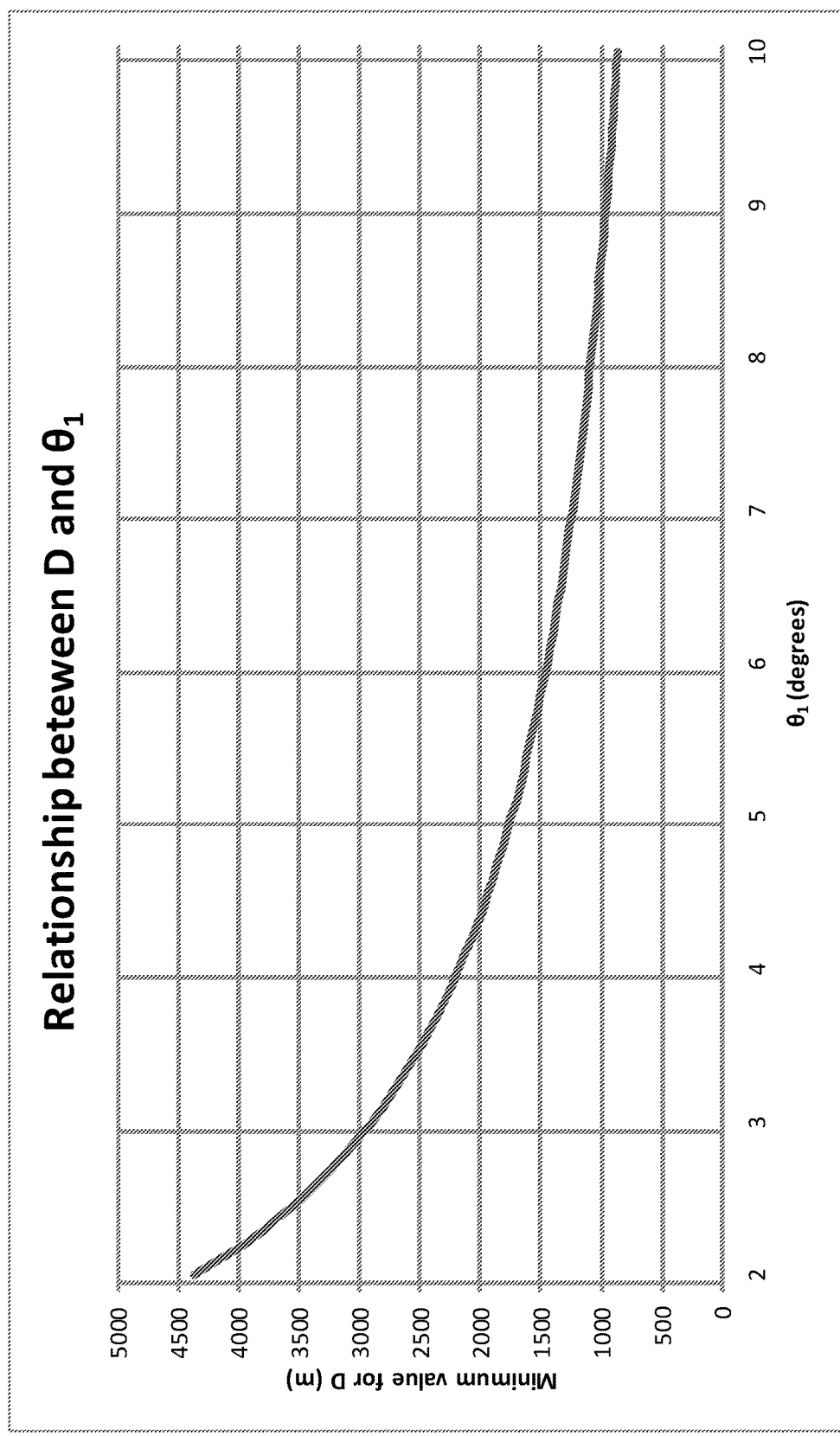
FIG. 12 is a graph indicating an example relationship between the distance between the last point of touch down and the start of the take-off runway (D) and the angle of ascent of an aircraft performing a go-around ($\theta_1$)

In practice, $\theta_1$ is set by the poorest performing aircraft allowed to land (whilst maintaining independent operation) at a particular airport when suffering a single engine failure. The graph in FIG. 12 shows how the distance D varies for various values of $\theta_1$ when assuming a typical value for H being 500 ft (152 m). This relationship allows an airport designer/operator to 1) select a value for D so as to ensure a certain class of aircraft are safe to land whilst maintaining independent operation; and/or 2) determine which classes of aircraft are safe to land whilst maintaining independent operation for a given D. For aircraft that are able to climb between 2°-7° (when not fully operational), the minimum value for D varies between approximately 1,500 m to 4,500 m. For aircraft that are able to climb between 2.5°-3.5° (when not fully operational), the minimum value for D varies between approximately 2,500 m to 3,500 m.

Twin-engine aircraft such as older models of a Boeing 737-400 or an Airbus A320 are often the poorest performing aircraft in large commercial airports (when suffering an engine failure); this class of aircraft can ascend at 3 degrees or slightly greater with a single engine failure. This provides a minimum value of D of approximately 2,900 m.

If an aircraft not meeting a predefined minimum climb rate (for example, a very old aircraft) wishes to land, it may be necessary to suspend independent operation of the runway arrangement until that aircraft has safely landed.

There are a number of distances that affect the length D, these are as follows:
- $L_1$—the length of the landing runway 202-1
- $d_1$—the distance from the start of the landing runway 202-1 to when the first aircraft takes off following a failure
- S—the length of the intermediate safety area 210

These distances are related by the following formula:

$$D=S+L_1-d_1$$

$L_1$ is typically determined by the distance required for an aircraft to come to a safe stop following landing, as is described above. An example distance is 2-4 km, preferably 3 km, or 3,100 m.

The size of the intermediate safety areas 210 (S) is determined by regulatory and safety considerations so as to ensure a minimum separation between aircraft. Such an area may also be used for aerials or other ground equipment such as ILS aerials. A typical distance is around 300 m-900 m, preferably 650 m.

$d_1$ is shown split into two distances $r_1$ and $t_1$ in FIG. 11b. $d_1$ defines the 'last touch-down point' if an aircraft is not on an approach path to touch down by this point, it would not touch-down; rather the aircraft would abort the landing, ascend again, turn and re-attempt the landing (in which case $t_1 \approx d_1$). The last touch-down point may be defined by the distance required for an aircraft to safely come to a stop. The minimum distance between this point and the start of the following runway section (D) therefore sets a restriction on the length of the safety area S and the length of the runway section $L_1$.

$t_1$ is the distance from the start of the landing runway 202-1 to the touch-down point. This may be set in part by regulatory requirements (for example, the provision of a RESA as described above) and the skill of a pilot.

$r_1$ is the distance that an aircraft travels along the runway 202-1 before taking off again. This may be determined by the capabilities of the aircraft in question, in many cases this distance may be negligible, with the aircraft briefly contacting the runway.

Substituting for D this gives a value for t1 defined by variables set predominantly by aircraft performance (i.e. $\theta_1$, $r_1$, and $L_1$) and variables set predominantly by regulatory requirements (i.e. H and S):

$$t_1 < S + L_1 - r_1 - \frac{H}{\tan\theta_1}$$

It is clear from the equation above that an increase in $H_1$ or $r_1$ necessitates a decrease in $t_1$; whereas an increase in of S, $L_1$ or $\theta_1$ relaxes the distance the 'last touch-down point' is to the start of the landing runway section 202-1.

A lower limit of $t_1$ may be set by the desire to avoid pilots attempting to land very close to the start of the landing runway section and touching down on a section (such as a RESA) prior to the landing runway section not explicitly designated for landing. Gusts of wind at the final approach (or other external effects) may mean touch downs very close to the start of the landing runway section would be difficult to repeat with sufficient reliability. A lower limit of 300 m-500 m may be used.

In one example $r_1$ may be zero, or close to zero corresponding to the aircraft merely 'grazing' the landing runway.

For an example where H is 500 ft (152 m), S is 650 m, $L_1$ is 3,100 m, $\theta_1$ is 3° and $r_1$ is zero this gives a value of t1 of around <850 m. In such a scenario, a landing zone is provided which is between around 300 m-800 m from the start of the runway section.

In one example, the 'last touch-down point', $t_1$, is less than 100 m from the start of the landing runway. In another example, $t_1$ is between 100 m and 1,500 m from the start of the landing runway. In another example, $t_1$ is between 100 m and 1,000 m from the start of the landing runway. In another example, $t_1$ is between 500 m and 800 m from the start of the landing runway.

The above restrictions defining a 'last touch-down point' generally apply to the scenario of an aircraft only becoming aware of a potential problem relatively close to the touch down point. In an alternative example, the distance D may be measured from the normal landing threshold (i.e. substantially the start of the landing runway). Such a loosening of requirements may be allowed where an aircraft is aware of a potential problem, so aims to touch down closer than when the aircraft is fully operational.

In an alternative example, there is a point determined as the 'missed approach point', typically a mile or further away from the start of the runway where an aircraft is deemed to be on a correct approach or not (e.g. at a particular height at a certain distance away from the runway). If an aircraft is not deemed to be on a correct approach path, it ascends to a suitable turning height (H) and re-attempts the landing. Where regulations allow, the distance D may be measured from the 'missed approach point'. In such an example, 'H' in the equation defining D above is in fact the difference between the height of the aircraft at the missed approach point and the safe turning height.

If an aircraft suffers an engine failure prior to the 'missed approach point', independent operation may be suspended and/or the aircraft may be directed to land on an alternative runway, This type of restriction may be enforced by regulatory bodies as an engine failure occurring after the missed approach point would be very rare. In such cases, one may assume that no engine failure would occur, so the climbing angle $\theta_1$ may be greater, for example 10°. Such an assumption would loosen the requirement on the last touch-down point, extending it further down the landing runway section.

In a further alternative, any of the above restrictions on the point of calculation of D may be applied in combination. The three alternatives are summarised below in order of decreasing safety:
1. Last touch-down: A calculation based on an engine failure or similar placing a restriction on the distance between the furthest an aircraft could touch down (so as to safely land) but still safely perform a missed approach in required.

2. Threshold: A calculation as per 1 above, but calculated from the start of the landing runway section.
3. Missed approach point: A set of restrictions assuming either an aircraft aborting an attempted landing and turning at a missed approach point at a significant distance before the landing runway, or assuming a fully operational aircraft.

Any of the above points may be called a 'missed approach point' depending on the regulations in place. In any of the above cases, in order for safe independent operation of an in-line runway arrangement, the distance between a missed approach point on a landing runway and the start of a take-off runway is greater than a distance D. The distance D is given by the formula $$D > \frac{H}{\tan\theta_1}.$$

Such a missed approach point may be physically marked on the runway arrangement (for example by lights, a painted line) and/or may be marked via software on an aircraft guidance system.

An angled or offset runway arrangement as described above with reference to FIGS. 5(b) to 10 would increase the separation between two aircraft by a distance related to the extent of angling and/or offset; such an arrangement may therefore slacken the restriction on $t_1$ compared to a single in-line extended runway as discussed above with reference to FIGS. 11 and 12.

Runway Lights

Aircraft pilots are guided into land, and to take off by numerous different systems or methods; a common way to guide aircraft to land being runway markings and lights. Lights are typically used to indicate the centre line and the edges of the runway so that the pilot does not stray outside the designated landing or take-off region.

When utilising an extended runway as described above with reference to FIGS. 2-10, there is the possibility that a landing pilot may confuse the lights on the distal take-off runway for the lights on the intended landing runway thereby landing on the incorrect runway (although other systems such as ILS aerials and air traffic controllers would likely reduce this possibility, if such systems are operational). Alternatively or in addition, the lights on the distal take-off section may distract the pilot from landing, or give the false impression of a single, long runway.

Figure 13:
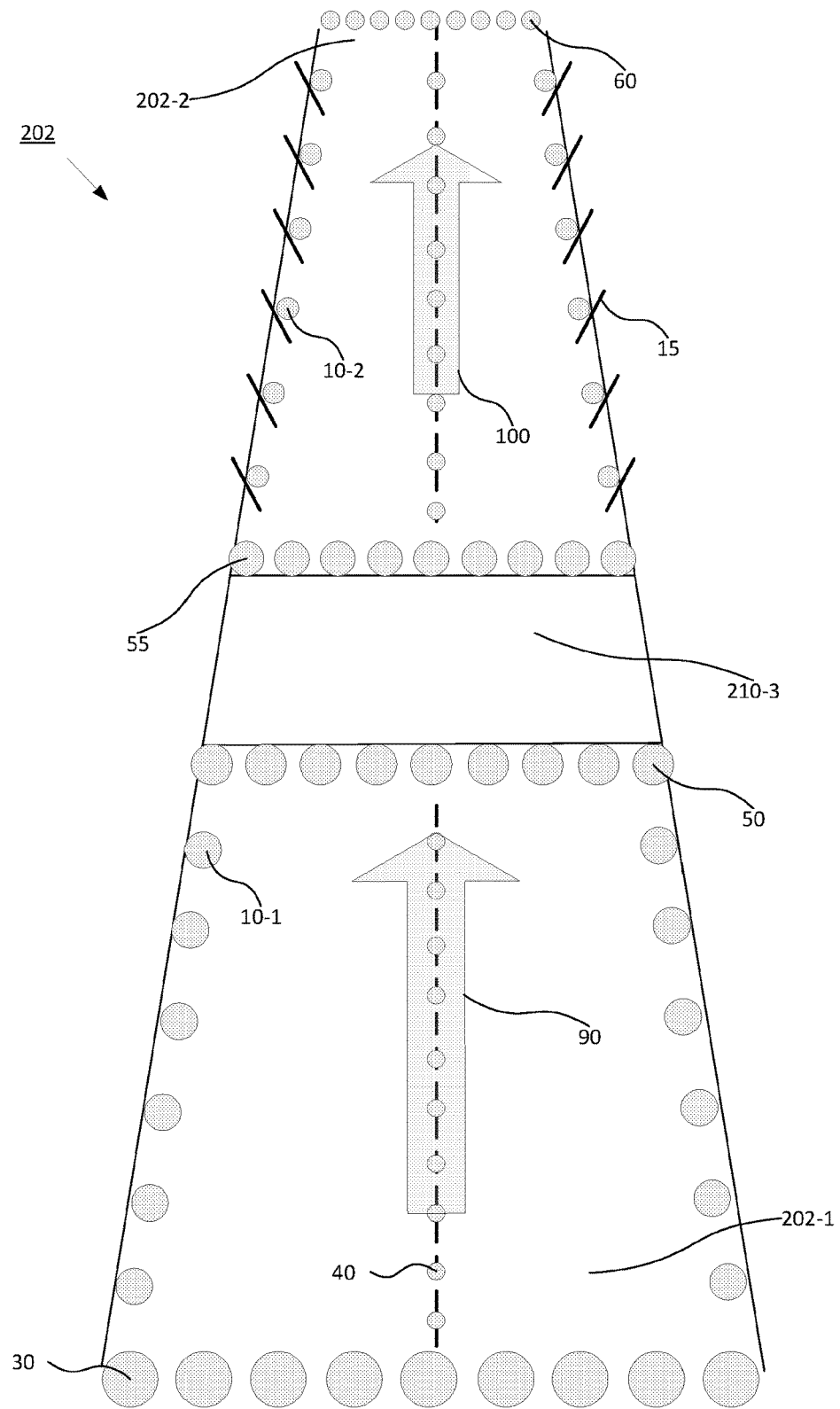
FIG. 13 shows a perspective view of the runway arrangement of FIG. 2(a) including a runway lighting system.

A runway arrangement similar to that described above with reference to FIG. 2a is shown in FIG. 13 in a perspective view. In this embodiment, the runways are arranged substantially in-line on the same longitudinal axis, with the runway arrangement comprising a proximal runway section 202-1 and one distal runway section 202-2. The common longitudinal axis can be indicated using a row of runway markings and/or lights 40, used to assist a pilot in navigation of a runway during taxiing, take-off or landing.

During conventional use, aircraft using the runway arrangement 202 travel in substantially the same longitudinal direction. Landing occurs at the proximal runway section 202-1 and take-off occurs at the distal runway section 202-2.

The two runway sections are separated by a sterile Intermediate Safety Area (ISA) 210-3. The presence of the ISA 210-3 lowers the risk of collision, should an aircraft landing on the proximal runway section 202-1 overshoot the end of the runway section. The ISA 210-3 provides additional space for such aircraft, and aircraft are not permitted to enter this area. Aircraft landing equipment such as ILS aerials may be placed within the ISA 210-3 to aid aircraft in landing on the proximal runway section 202-1, and taking off from the distal runway section 202-2. Placement of such equipment within the intermediate section 210-3 increase the quality of the signal as there would always be a direct line of sight from the aerial to the aircraft requiring guidance (as described above with reference to FIGS. 5 and 6).

The start of the proximal runway section 202-1 can be demarcated using a row of lights and/or runway markings and/or lights 30. These lights and/or runway markings 30 assist the pilot in ascertaining the start of the runway, lights being particularly suitable in inclement weather or at night. The start of the ISA 210-3 can be similarly demarcated using a row of lights and/or runway markings 50. These lights and/or runway markings 50 also display to the pilot the end of the runway located at the proximal end 202-1 of the runway arrangement 202. The end of the ISA 210-3 and the start of the proximal runway section 202-1 can be similarly demarcated using another row of lights and/or runway markings 55. The end of the distal runway section 202-2 can be displayed to a pilot using a row of lights and/or runway markings 60.

It is important for the safety of the aircraft for any pilot attempting to take off or land using the runway arrangement 202 to be aware of the width and precise location of the runway 202. The width is measured perpendicularly to the longitudinal axis of the runway, demarcated using the lights 40. The runway arrangement 202 therefore further comprises one or more lights 10 running parallel to the longitudinal axis of the runway arrangement 202, situated at the periphery of the runway arrangement 202.

When approaching the runway arrangement 202 for a landing, the pilot may confuse the lights on the distal runway section 202-2 for the lights on the intended proximal runway section 202-1, thereby landing on the incorrect runway. There is a further risk that the lights on the distal take-off section may distract the pilot from landing, or give the false impression of a single, longer runway. It is therefore important for the lights 10, also referred to as 'directional lights' 10, to be visible to a pilot of an aircraft approaching to land on that particular section of the runway arrangement 202. Light directors 15 for directing the light from the runway light source 10 are provided so as to inhibit light emanating from the light source in a specified direction or range of directions.

The light directors 15 are advantageously arranged so that only the directional lights 10-1 from the proximal runway section 202-1 are visible to a pilot approaching the runway arrangement 202 when landing an aircraft. Light from directional lights sources 10-2 situated on the distal runway section 202-2 are substantially blocked by blocking means 15 in the range of directions which may be seen by a pilot of an aircraft approaching landing on the proximal runway section 202-1. In such a way, the distal runway section 202-2 is designated as a non-landing runway section. The light directors 15 are arranged so that the directional lights sources 10-2 from the distal end 202-2 of the runway arrangement 202 are visible to a pilot taking off from the distal runway section 202-2.

The light directors 15 may comprise means for selectively blocking light (such as blocking means). The blocking means may be adjustable so as to be able to tailor the amount/extent of light that is blocked depending on the location of the light source. An aircraft departing on the distal runway section 202-2 would need to see the all the light sources 10-2 along this runway section 202-2 at the start of this section. This means that the light sources 10-2 most proximal on the distal runway section 202-2 can be blocked to a greater extent to those at the distal end of the runway section 202-2. Such a 'tapering' can be achieved by using blocking means (as shown in FIGS. 11 to 13 below), using an opaque section of material surrounding the light source 10-2, placing a physical barrier between the light source 10-2 and the pilot, or reducing the brightness of the light source 10-2 such that they are not visible from more than a certain distance.

In an alternative embodiment, the light directors 15 comprise a lens, or lens arrangement so that light is focussed so as to be directed only in a specified direction or range of directions.

As described above, conventionally the proximal runway section 202-1 is used for aircraft to land, and the distal runway section 202-2 is used for aircraft take off. However it can be advantageous in terms of reducing disturbance to local communities if aircraft land at the distal end 202-2 of the runway arrangement 202 (referred to as a 'long landing'). In doing so, more of the flight path of the aircraft is over uninhabited runway, and the aircraft can approach the runway arrangement 202 at a greater altitude than if it were aiming to land at the proximal end 202-1, leading to reduced disturbance for those living underneath the flight path. The aircraft can be landed at the distal end 202-2 of the runway arrangement 202 if the distal end is not being used for a take-off, or if the aircraft is arriving at such a time when disturbance is to be minimised.

Figure 14:
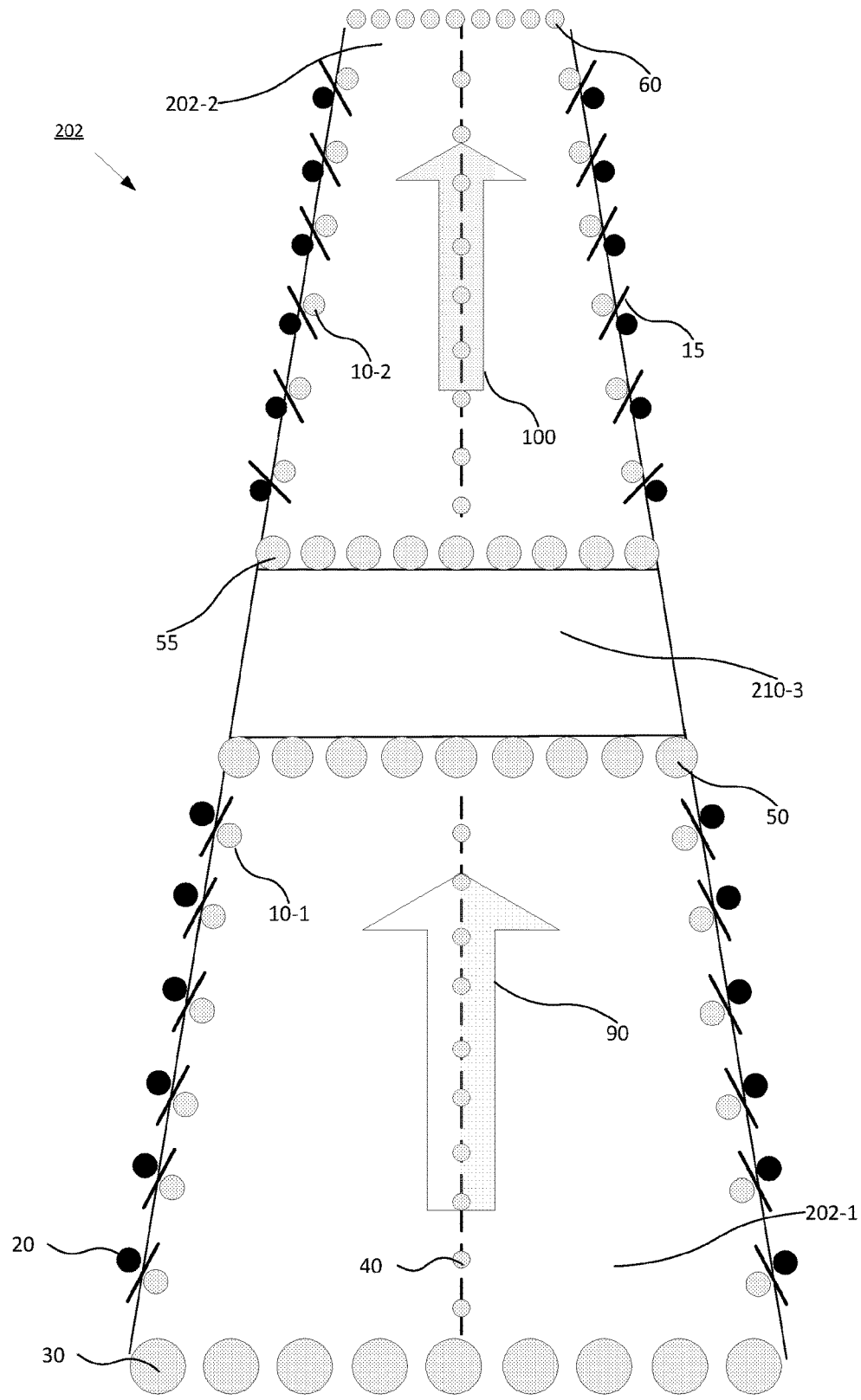
FIG. 14 shows a perspective view of the runway arrangement of FIG. 2 including an alternative runway lighting system including secondary runway lights.

In this scenario, the pilot should be able to see the directional lights 10 surrounding the distal end 202-2 of the runway arrangement 202. These directional lights 10 are normally blocked in such a way that they are not visible to pilots landing aircraft. In order to increase the safety of the landing procedure on the distal end 202-2, one or more secondary light sources 20 can be placed adjacent said directional lights 10, as shown in FIG. 14. The secondary light sources 20, when illuminated, can provide information to the pilot regarding the location of the proximal end 202-2 of the runway arrangement 202, even when the blocking means 15 block the light from the directional light sources 10 in that particular direction. In an alternative embodiment, the blocking means 15 may be movable so that the directional light sources 10 are visible by the landing aircraft. In either embodiment, the lighting on the proximal runway section 202-1 would be switched off so that the pilot is unambiguously directed to the distal runway section 202-2.

The description above describes the use of the runway arrangement 202 in a first orientation, whereby aircraft can land at the proximal end 202-1 and take off at the distal end 202-2. As described above, the direction of the aircraft using each of the individual runways is substantially similar and can be displayed as arrows or other markings on the runway 90, 100. However the runway arrangement 202 can also be used in a second orientation, whereby the direction of the aircraft using each of the individual runways is longitudinally reversed. An aircraft can land at the distal end 202-2 and travel towards the ISA 210-3 whilst an aircraft takes off from the proximal end 202-1 away from the ISA 210-3.

In this second orientation, the same safety concerns apply, in that it is necessary for the pilot to be able to clearly see and identify the area from which to take off or land the aircraft. The directional light sources 10, blocking means 15 and secondary light sources 20 therefore can be operable as a system to provide the pilot with this information in either of the two orientations.

FIG. 14 shows a runway arrangement 202 wherein both directions of operation are possible whilst maintaining the light blocking feature as described above with reference to FIG. 13. In the embodiment shown, the directional light sources 10-1 and 10-2 along the runway sections 202-1 and 202-2 are mirror-images of one-another with mirrored light directors 15. Secondary lighting 20 may be provided on both runway sections 202-1 and 202-2 thereby to allow 'long landings' when the runway arrangement is used in either direction. However, long landings may only be used in one direction of operation (for example if the runway arrangement 202 only has a significant population near one end), so secondary lighting 20 may only be provided on one section. Alternatively, movable light directors 15 may be provided as described above instead of (or in addition to) secondary lighting 20.

Figure 15:
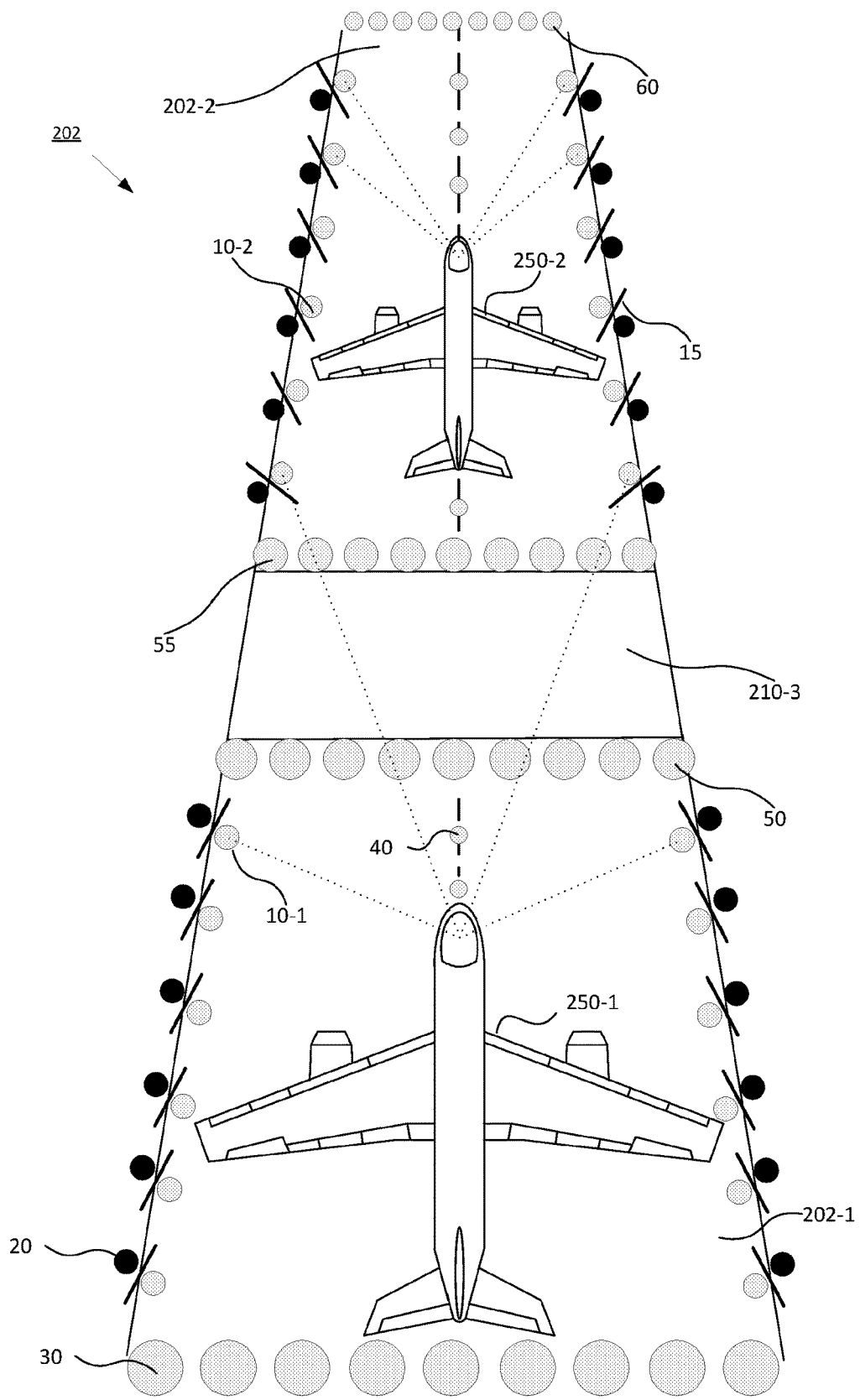
FIG. 15 shows a perspective view of the sightline of pilots landing and taking off from the runway arrangement of FIG. 14.

FIG. 15 shows a perspective view of the sightline of pilots landing and taking off from the runway arrangement 202, comparing the view from the lighting system 10-1, 10-2 at the proximal end 202-1 of the runway arrangement 202 to that from the distal end 202-2 of the runway arrangement 202. Light sources 10-2 on the distal runway section 202-2 are inhibited by light directors 15 from shining in the direction of a landing aircraft approaching or on the proximal runway section 202-1. However, an aircraft on the distal runway section 202-2 is able to see the light sources 10-2 all the way along the distal runway section 202-2 so as to guide a take-off.

In one embodiment, the light sources 10-2 are not visible to the pilot of the landing aircraft until the start of the ISA 210-3 (indicated by the lights and/or runway markings 50). This example would minimise the likelihood of confusion as the pilot of the landing aircraft would never see the lights on the distal runway section. However, such extreme directing may inadvertently inhibit light from being directed in the direction of an aircraft taking off. In a further embodiment the light sources 10-2 become visible to the pilot of the landing aircraft once they have touched down on the proximal runway section 202-1. This extent of blocking may be sufficient as by the time an aircraft has touched down on the correct runway, it is unlikely that an overrun would occur. In a further embodiment the light sources 10-2 become visible to the pilot of the landing aircraft once they are at a distance from the proximal runway section 202-1 once they have planned their descent and their choice of runway has become clear. It therefore does not cause confusion if the lights 10-2 are visible as well as the light sources 10-1, as the pilot is already aware of the runway on which they are to land. Further embodiments are possible where the light sources 10-2 become visible to the pilot of the landing aircraft at any distance between the distances mentioned above.

Figure 16:
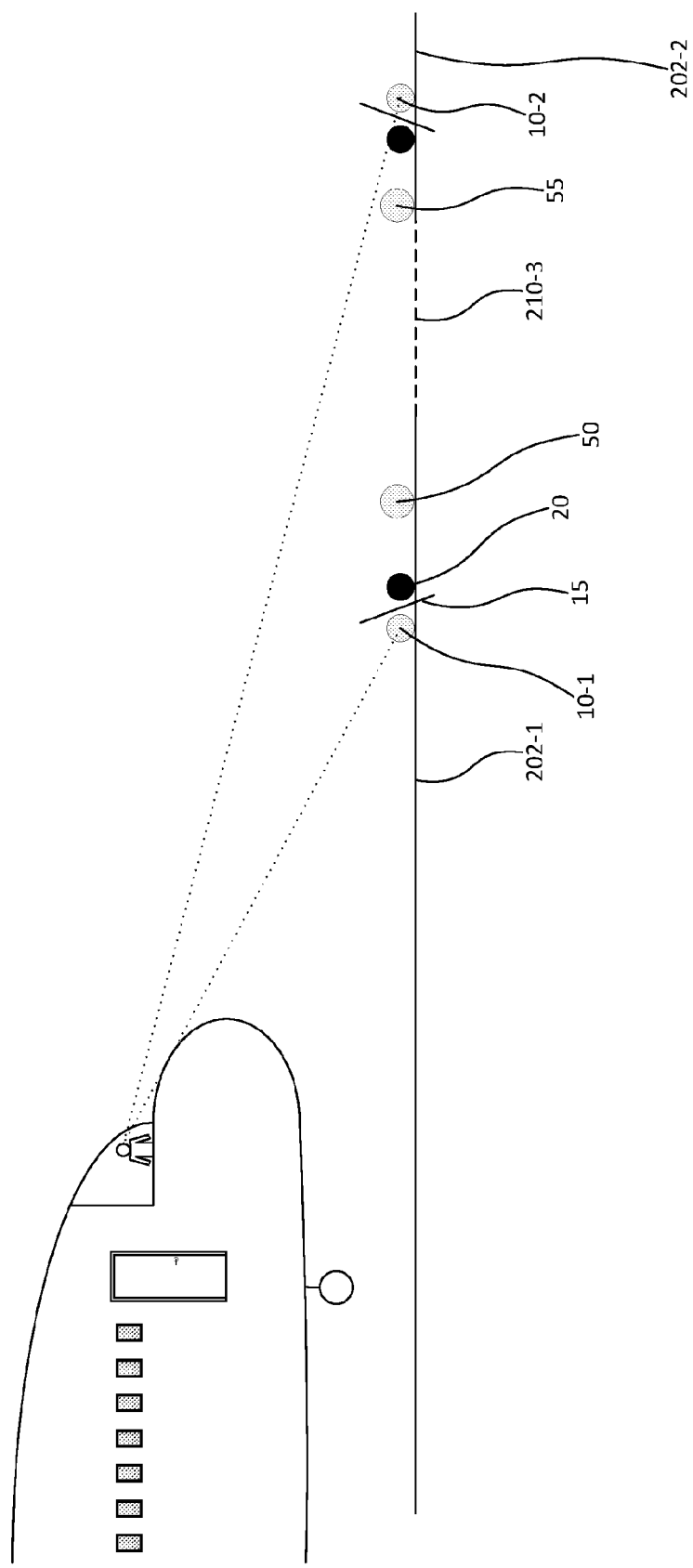
FIG. 16 shows a side-on schematic view of the sightline of pilots landing and taking off from the runway arrangement.

FIG. 16 shows a side view of the sightline of pilots landing and taking off from the runway arrangement 202, comparing the view from the lighting sources 10-1 at the proximal end 202-1 of the runway arrangement 202 to that from the distal end 202-2 of the runway arrangement 202. As a result of the arrangement of the light blocking means 15, the directional light sources 10-1 at the proximal end 202-1 are visible, whereas the directional light sources 10-2 at the distal end 202-2 are not. It is therefore made clearer to the pilot where the landing is supposed to take place.

Figure 17A:
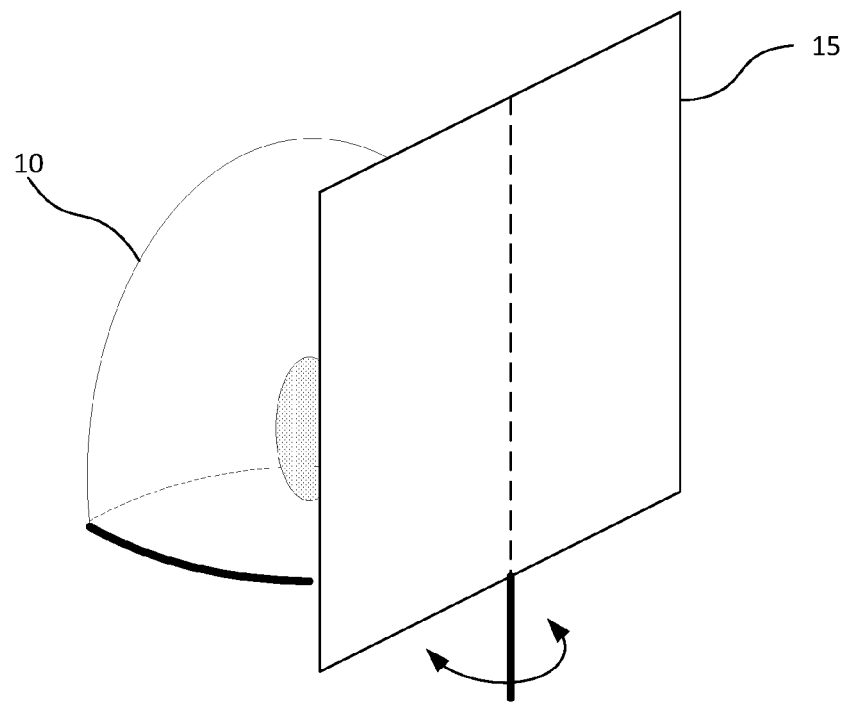
FIGS. 17(a) and 17(b) show example selectively blocked runway lights.

FIG. 17(*a*) shows light directors 15 (in the form of a means for selectively blocking light) beside a light source 10 so as to block light in a certain range of directions. The blocking means 15 in FIG. 15(*a*) is shown as being able to rotate. This may be so that it can be moved out of the way so that the light source 10 can perform the function of a secondary light 20, and/or for installation (or adjustment) purposes so as to allow adjustment of the angle of the blocking means 15. The rotation may be about an axis of the blocking means 15, or the blocking means 15 may be movable with respect to the light source 10, for example, around a circle with the light source 10 at the centre. Alternatively, the arrangement comprising the light source 10 and light blocker 15 may rotate.

Figure 17B:
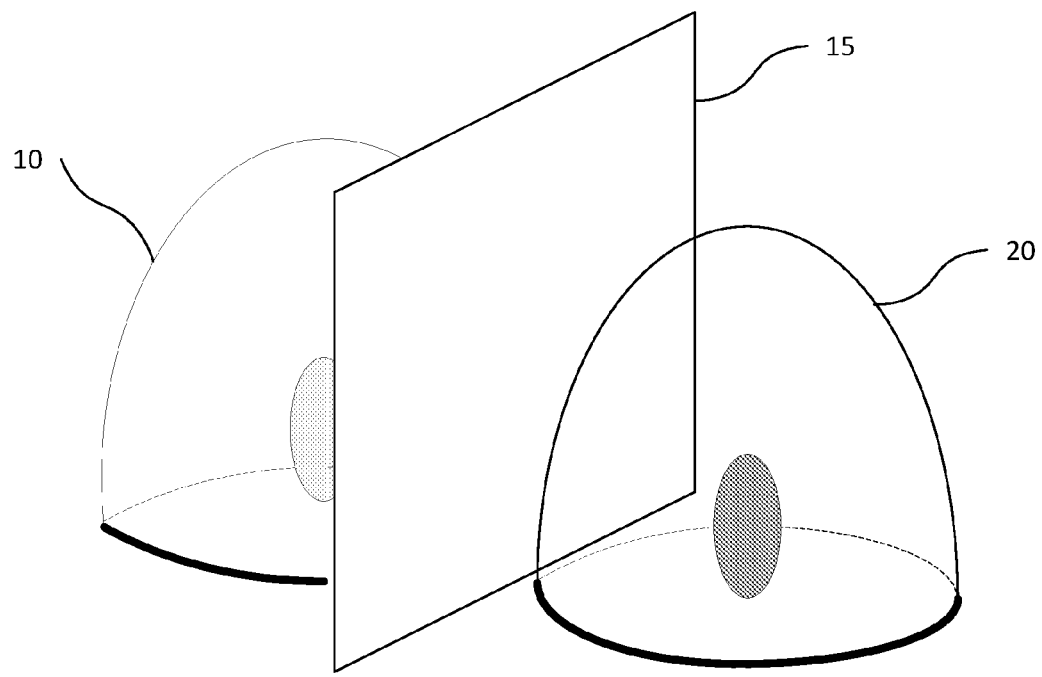

FIG. 17(b) illustrates the relative placement of a directional light source 10 and a secondary light source 20.

Figure 18A:
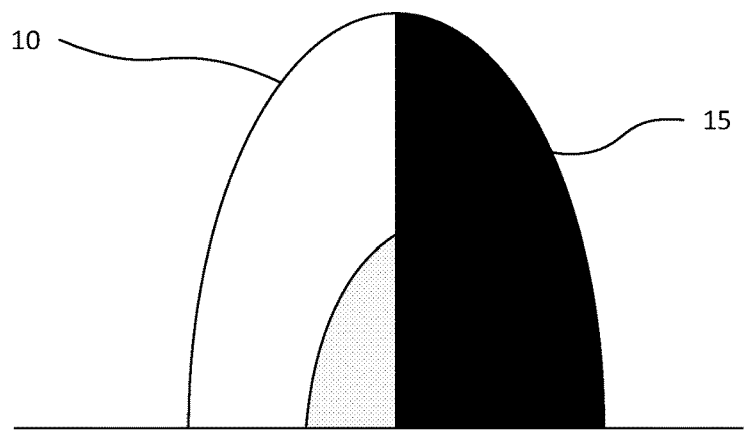
FIGS. 18(a) and 18(b) show example runway lights with an opaque covering.

FIG. 18(a) illustrates an embodiment of a directional light source 10, whereby the light source 10 is embedded in the surface of the runway arrangement 202. The light blocker 15 comprises an opaque covering of a portion of the directional light source 10, blocking the emission of light in a specified direction.

Figure 18B:
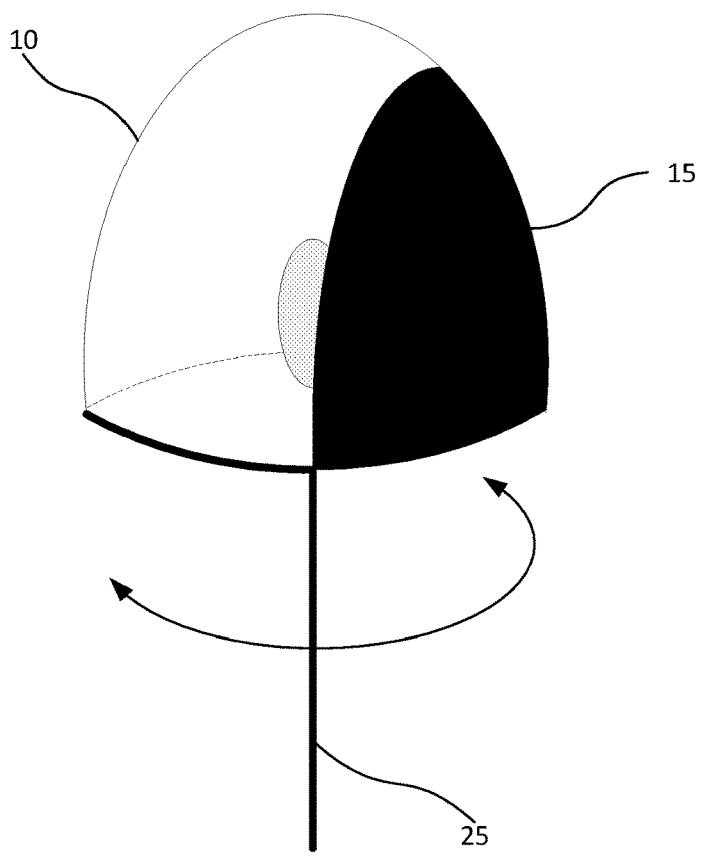

FIG. 18(b) illustrates a particular embodiment of a directional light source 10. As in FIG. 18(a), the light blocker 15 comprises an opaque covering of a portion of the directional light source 10. However in this embodiment, the directional light source 10 is operable to rotate on an axis 25. The direction in which the light is blocked can therefore be varied according to the direction from which the directional light source 10 is to be made visible. In this embodiment secondary light sources 20 may not be required, as if an aircraft was to land on the distal end 202-2 of the runway arrangement 202, or any other situation which required the use of the secondary light sources 20, the directional light sources 10 could be rotated about their shafts 25. The light could therefore be made visible to the pilot, whereas it would not have been before.

A relatively simple manner in which the visibility of lights 10, 40 can be tailored would be to make the light sources 10, 40 on the distal runway section 202-2 dimmer (less bright) than those on the proximal runway section 202-1. Aircraft taking off from the distal runway section 202-2 only need to see runway light sources 10, 40 which are a maximum distance of the length of the runway section 202-2 (i.e. being able to see the furthest light sources 10, 40 when starting their take-off), however, aircraft approaching to land need to see landing light sources 10, 40 from much further away. For this reason, dimming the light sources 10, 40 on the distal runway section 202-2 would not adversely affect aircraft taking off. This approach may be used in conjunction to the blocking means 15 described above.

The brightness (intensity) of the light sources 40, 10 may be controllable (e.g. by air traffic controller) so as to switch which set of light sources is brighter when the mode of operation is changed (e.g. for 'long landings', or for when the direction of operation is reversed). In addition, the intensity of the light sources 40, 10 may be adjustable depending on the visibility. In low visibility conditions (<2 mile visibility), it may not be possible for a landing aircraft to clearly see the light sources on the distal runway section 202-2, so full intensity may be utilised to aid a taking-off aircraft.

A similar light blocking system as described above may be provided with respect to the centreline light sources 40. Inhibiting landing pilots from being able to see the centreline light sources on the distal runway section 202-2 would further reduce the potential for confusion as to on which runway section to land.

In an alternative embodiment, runway lighting using polarised light may be utilised so that pilots are unambiguously directed to the correct landing runway. In such an embodiment, the runway light sources 10-2, 40-2 on the distal runway section 202-2 comprise means for emitting light with a specific polarisation. A pilot approaching the runway arrangement may utilise a means for blocking the light with the specific polarisation so that it is less visible to him or her. The light from the runway light sources 10-1, 40-1 may either have no polarisation or an opposing polarisation so that less of this light is blocked by the pilot's means for blocking the light with the specific polarisation.

The means for blocking the light with the specific polarisation may comprise, head-up display, helmet-mounted display, a screen between the pilot and the cockpit window, a polarising camera which the pilot views through a screen. Such devices may be used in addition to other 'artificial vision' pilot aids such as augmented reality displays.

Visibility permitting, the means for blocking the light with the specific polarisation may comprise glasses or goggles that the pilot would wear during landing and/or a coating or covering applied to the cockpit window. Such devices may reduce the visibility of the landing approach and thus may not be preferable in inclement weather.

The means for producing polarised light from the runway light sources 10, 40 may comprise polarising filters, reflecting polarisers, and/or scattering polarisers. The specific polarisation may be horizontal, vertical, circular (clockwise or anticlockwise) or any combination thereof.

In order for the runway arrangement 202 to be used in different modes (e.g. 'long landings' or for when the direction of operation is reversed), the polarisation of the runway light sources 10, 40 may be adjustable. In one embodiment, the polarising means is adapted to switch between a first polarisation indicating a landing runway section and a second polarisation indicating a take-off runway section. In one example, switching polarisation comprises rotating a polarising filter by approximately 90°.

The use of polarised runway lighting to block the visibility of light directed towards a landing aircraft may be utilised instead of, or in addition to, the physical blocking methods described above with reference to FIGS. 13 to 19.

ALTERNATIVES AND MODIFICATIONS

Although the above description refers to many examples where an airport runway arrangement has two parallel runways, the invention extends to situations where there is a single runway. This would be particularly advantageous in an urban environment where there is only space for a single runway. Furthermore, the invention can also be applied to airports with more than one non-parallel runway. This would be particularly advantageous in order to increase passenger capacity in situations where non-parallel runways are independently used depending on wind conditions or where space constraints require runways to be non-parallel.

The above description includes numerous references to runway and airport configuration dimensions. These dimensions are merely examples and a person skilled in the art would appreciate that these are dependent on factors such as type of aircraft and the regulations covering the airport. Such modifications could be made by a person skilled in the art and therefore are within the scope of the invention.

In one example, the safety area 510 being sterile means that aircraft do not typically use this area for landings or taxiing during normal operation. However, the sterile safety area 510 is used only infrequently for take-offs, in particular when done in a phased manner, but would only use the area for landing or taxiing during adverse or exceptional circumstances.

Although many of the runway arrangements described above have been explicitly described as being combined together, any two runway arrangements may be combined, for example, any two runway arrangements as shown in FIG. 8 positioned side-by-side.

It should be appreciated that the orientation of the runway arrangements described above a only examples, alternate orientations (such as a North-South orientation, or the runway arrangement being angled in an opposing direction) would be possible depending on the location. Furthermore, extending a runway in a specific direction (for example, to the West) could equally be performed in the opposing direction (for example, to the East).

Other means for blocking light directed towards a landing aircraft may be utilised, for example artificial vision video processing software may remove or reduce the light detected originating from a runway section which is not to be used for landing.

Various other modifications will be apparent to those skilled in the art and will not be described in further detail here.

It will be understood that the present invention has been described above purely by way of example, and modifications of detail can be made within the scope of the invention.

Reference numerals appearing in the claims are by way of illustration only and shall have no limiting effect on the scope of the claims.

The invention claimed is:

1. A runway arrangement comprising:
   a first runway section designated as a landing runway section;
   a second runway section designated as a take-off runway section; and
   a sterile safety area;
   wherein the first and second runway sections are linked by the sterile safety area;
   wherein the runway arrangement comprises a missed approach point for aircraft due to land on the first runway section, displaced from the start of the second runway section by a distance greater than $H/\tan\theta_1$;
   wherein H is a safe turning height and $\theta_1$ is an angle of ascent following a missed approach; and
   wherein H is greater than 150 m and $\theta_1$ is greater than 2°.

2. The runway arrangement according to claim 1 wherein the missed approach point is at least one of between 1,500 m and 4,500 m from the start of the second runway section, between 2,500 m and 3,500 m from the start of the second runway section, and approximately 3,000 m from the start of the second runway section.

3. The runway arrangement according to claim 2 wherein the missed approach point is a landing threshold marked on said first runway section.

4. The runway arrangement according to claim 3 wherein the landing threshold is at least one of between 100 m and 1,500 m from the start of the second runway section, between 100 m and 1,000 m from the start of the second runway section, between 300 m and 800 m from the start of the second runway section, and between 500 m and 800 m from the start of the second runway section.

5. The runway arrangement according to claim 1 wherein the second runway section is disposed at an angle to the first runway section.

6. A runway arrangement comprising:
   a first runway section;
   a second runway section;
   a sterile safety area; and
   a third, laterally offset, runway section;
   wherein the first and second runway sections are linked by the sterile safety area and the second runway section is disposed at an angle to the first runway section; and
   wherein the third runway section is arranged such that: the third runway section is substantially parallel to, and substantially longitudinally aligned with, said first runway section; the third runway section is laterally offset from said first runway section so that the centerline of the laterally offset runway does not intersect with the second runway section; and/or the runway arrangement satisfies the inequality $D>L\sin(\theta)$ or $D+O>L\cdot\sin(\theta)$, wherein D is the separation between the first runway section and the third runway section, L is the length of the first runway section, $\theta$ is the angle between the first runway section and the second runway section, and O is the distance between the centerlines of the first runway section and the second runway section.

7. A runway arrangement comprising:
   a first runway section;
   a second runway section disposed at an angle to the first runway section;
   a sterile safety area; and
   a third runway section substantially in prolongation of the first runway section, thereby forming a 'y-shaped' runway arrangement;
   wherein the first and second runway sections are linked by the sterile safety area; and
   wherein the first and third runway sections are linked by the sterile safety area.

* * * * *

UNITED STATES PATENT AND TRADEMARK OFFICE
CERTIFICATE OF CORRECTION

| | | |
|---|---|---|
| PATENT NO. | : 10,472,093 B2 | Page 1 of 1 |
| APPLICATION NO. | : 15/302775 | |
| DATED | : November 12, 2019 | |
| INVENTOR(S) | : Lowe et al. | |

It is certified that error appears in the above-identified patent and that said Letters Patent is hereby corrected as shown below:

In the Claims

In Column 40, Line 21, in Claim 6, after "that:", insert --¶--

In Column 40, Line 24, in Claim 6, after "section;", insert --¶--

In Column 40, Line 27, in Claim 6, after "and/or", insert --¶--

Signed and Sealed this
Twenty-ninth Day of December, 2020

Andrei Iancu
*Director of the United States Patent and Trademark Office*